(12) United States Patent
Hosseini et al.

(10) Patent No.: US 10,652,885 B2
(45) Date of Patent: May 12, 2020

(54) CHANNEL STATE INFORMATION REPORTING FOR SYSTEMS WITH MULTIPLE TRANSMISSION TIME INTERVALS

(71) Applicant: QUALCOMM Incorporated, San Diego, CA (US)

(72) Inventors: Seyedkianoush Hosseini, San Diego, CA (US); Wanshi Chen, San Diego, CA (US); Alberto Rico Alvarino, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/968,154

(22) Filed: May 1, 2018

(65) Prior Publication Data

US 2018/0324797 A1     Nov. 8, 2018

Related U.S. Application Data

(60) Provisional application No. 62/500,472, filed on May 2, 2017.

(51) Int. Cl.
*H04W 4/00*      (2018.01)
*H04W 72/04*     (2009.01)
*H04L 5/00*      (2006.01)

(52) U.S. Cl.
CPC ....... *H04W 72/0446* (2013.01); *H04L 5/0048* (2013.01); *H04L 5/0057* (2013.01); *H04W 72/042* (2013.01)

(58) Field of Classification Search
USPC ........ 370/229, 230, 241, 252, 328, 329, 330
See application file for complete search history.

(56) References Cited

U.S. PATENT DOCUMENTS

2013/0148613 A1*  6/2013  Han .................... H04L 1/0026
                                                    370/329
2013/0250903 A1*  9/2013  Ahn ................. H04W 72/0413
                                                    370/329

(Continued)

FOREIGN PATENT DOCUMENTS

WO    WO-2016077701 A1    5/2016

OTHER PUBLICATIONS

ETSI TS 136213 V13.0.0, LTE; Evolved Universal Terrestrial Radio Access (E-UTRA); Physical layer procedures (3GPP TS 36.213 version 13.0.0 Release 13), May 2016, p. 157 (sub clause 7.2.5) and p. 86-87 (sub clause 7.2.1) (Year: 2016).*

(Continued)

*Primary Examiner* — Kwang B Yao
*Assistant Examiner* — Nguyen H Ngo
(74) *Attorney, Agent, or Firm* — Holland & Hart LLP

(57)   ABSTRACT

A user equipment (UE) may establish a configuration for communication utilizing a first transmission time interval (TTI) length and a second TTI length that is shorter than the first TTI length. The first TTI length may be associated with a first traffic type (e.g., a first latency or reliability characteristic) and the second TTI length may be associated with a second traffic type (e.g., a second latency or reliability characteristic). The UE may identify a trigger for a channel state information (CSI) report associated with the second TTI length and identify a reference resource for the CSI report (e.g., having the second TTI length). The UE may generate the CSI report based on the reference resource, and may transmit the CSI report during a reporting TTI and in response on the identified trigger.

76 Claims, 12 Drawing Sheets

(56) References Cited

U.S. PATENT DOCUMENTS

| | | | |
|---|---|---|---|
| 2013/0329662 A1* | 12/2013 | Chen | H04W 72/0473 370/329 |
| 2015/0124638 A1 | 5/2015 | Sun et al. | |
| 2015/0207604 A1* | 7/2015 | Sun | H04B 7/0626 370/329 |
| 2015/0222400 A1* | 8/2015 | Xiong | H04L 1/0026 370/329 |
| 2016/0205676 A1 | 7/2016 | Chen et al. | |
| 2016/0309466 A1 | 10/2016 | Chen et al. | |
| 2017/0265169 A1 | 9/2017 | Chen et al. | |
| 2018/0048447 A1 | 2/2018 | Nogami et al. | |
| 2018/0049165 A1* | 2/2018 | Byun | H04B 7/26 |
| 2018/0097604 A1* | 4/2018 | Bagheri | H04L 5/0051 |
| 2018/0098235 A1* | 4/2018 | Bagheri | H04L 5/0051 |
| 2018/0176938 A1* | 6/2018 | Shao | H04W 72/0493 |
| 2018/0206265 A1* | 7/2018 | Lee | H04L 5/00 |
| 2018/0376397 A1 | 12/2018 | Maeda | |
| 2019/0116592 A1* | 4/2019 | Moon | H04L 5/00 |

OTHER PUBLICATIONS

International Search Report and Written Opinion—PCT/US2018/030602—ISA/EPO—dated Jul. 25, 2018.

Motorola Mobility, et al: "CSI Aspects of Shortened TTI," 3GPP Draft; R1-1705547_CSI Aspects of Shortened TTI_V0, 3rd Generation Partnership Project (3GPP), Mobile Competence Centre; 650, Route Des Lucioles; F-06921 Sophia-Antipolis Cedex; France, vol. RAN WG1, No. Spokane, USA; 20170403-20170407, Apr. 2, 2017, XP051243675, 2 pages, Retrieved from the Internet: URL: http://www.3gpp.org/ftp/Meetings_3GPP_SYNC/RAN1/Docs/ [retrieved on Apr. 2, 2017].

NTT DOCOMO, et al., "CSI Feedback for Shortened TTI with Reduced Processing Time," 3GPP Draft; R1-1705694, 3rd Generation Partnership Project (3GPP), Mobile Competence Centre; 650, Route Des Lucioles; F-06921 Sophia-Antipolis Cedex; France, vol. RAN WG1, No. Spokane, USA; 20170403-20170407, Apr. 2, 2017, XP051243810, 7 pages, Retrieved from the Internet: URL: http://www.3gpp.org/ftp/Meetings_3GPP_SYNC/RAN1/Docs/ [retrieved on Apr. 2, 2017].

Panasonic: "UL Simultaneous Transmission between sTTI and TTI," 3GPP Draft; R1-1705135, 3rd Generation Partnership Project (3GPP), Mobile Competence Centre; 650, Route Des Lucioles; F-06921 Sophia-Antipolis Cedex; France, vol. RAN WG1, No. Spokane, USA; 20170403-20170407, Apr. 2, 2017, XP051243266, 3 pages, Retrieved from the Internet: URL: http://www.3gpp.org/ftp/Meetings_3GPP_SYNC/RAN1/Docs/ [retrieved on Apr. 2, 2017].

* cited by examiner

CHANNEL STATE INFORMATION REPORTING FOR SYSTEMS WITH MULTIPLE TRANSMISSION TIME INTERVALS

CROSS REFERENCES

The present application for patent claims the benefit of U.S. Provisional Patent Application No. 62/500,472 by HOSSEINI et al., entitled "CHANNEL STATE INFORMATION REPORTING FOR SYSTEMS WITH MULTIPLE TRANSMISSION TIME INTERVALS," filed May 2, 2017, which is assigned to the assignee hereof, and expressly incorporated by reference herein in its entirety.

BACKGROUND

The following relates generally to wireless communication, and more specifically to channel state information (CSI) reporting for systems with multiple transmission time intervals.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some cases, a base station may utilize feedback from a UE to coherently configure a communications link between the base station and the UE. For example, a UE may send channel information to the base station using a CSI report, which may be sent periodically or triggered as needed by the base station. The CSI report may provide information associated with channel conditions for a transmission received at the UE over a particular transmission time interval (TTI). However, some wireless systems may utilize different TTIs having different durations, and it may be desirable to implement techniques that enable efficient CSI reporting processes in such systems.

SUMMARY

The described techniques relate to improved methods, systems, devices, or apparatuses that support channel state information (CSI) reporting for systems with multiple transmission time intervals (TTIs). Generally, the described techniques provide for CSI reporting in systems utilizing low latency TTIs and non-low latency TTIs, where CSI reporting for different traffic types (e.g., different transmission characteristics such as latency or reliability) may be triggered using a single trigger associated with one traffic type or another. In some cases, a traffic type may be associated with one or more TTI lengths. For example, a user equipment (UE) may establish a configuration for communication via a first traffic type, such as Long Term Evolution (LTE) services, utilizing a first TTI length (e.g., a 1 ms TTI, or a subframe) and a second traffic type utilizing a second TTI length that is shorter than the first TTI length (e.g., a shortened TTI or sTTI). The UE may also identify a trigger for a CSI report associated with the second traffic type (e.g., a trigger for a CSI report associated with the second TTI length), and may in turn identify a reference resource for the CSI report corresponding to the second traffic type. The reference resource may include a TTI having the second TTI length and may be identified based on a reporting configuration associated with the second TTI length. For example, the reference resource may be included within a TTI of the first TTI length, or may be identified based on a reporting TTI for the CSI report. The UE may generate the CSI report based on the reference resource, and may transmit the CSI report during the reporting TTI and in response to the identified trigger. In some cases, the UE may determine that a number of unreported CSI requests exceeds a threshold (e.g., a CSI processing capability threshold), and may prioritize generation of CSI reports from the unreported CSI request based at least in part on a timing of triggers associated with the unreported CSI requests, traffic type priorities associated with the unreported CSI requests, a timing of reporting TTIs associated with the unreported CSI requests, a length of TTIs associated with the unreported CSI requests, etc.

A method of wireless communication is described. The method may include establishing a configuration for communication utilizing a first TTI length and a second TTI length that is shorter than the first TTI length, identifying a trigger for a CSI report associated with the second TTI length, identifying a reference resource for the CSI report, where the reference resource includes a TTI having the second TTI length and is identified based on a reporting configuration associated with the second TTI length, generating the CSI report based on the reference resource, and transmitting the CSI report during a reporting TTI and in response to the identified trigger.

An apparatus for wireless communication is described. The apparatus may include a processor, memory in electronic communication with the processor, and instructions stored in the memory. The instructions may be executable by the processor to cause the apparatus to establish a configuration for communication utilizing a first TTI length and a second TTI length that is shorter than the first TTI length, identify a trigger for a CSI report associated with the second TTI length, identify a reference resource for the CSI report, where the reference resource includes a TTI having the second TTI length and is identified based on a reporting configuration associated with the second TTI length, generate the CSI report based on the reference resource, and transmit the CSI report during a reporting TTI and in response to the identified trigger.

Another apparatus for wireless communication is described. The apparatus may include means for establishing a configuration for communication utilizing a first TTI length and a second TTI length that is shorter than the first TTI length, identifying a trigger for a CSI report associated with the second TTI length, identifying a reference resource for the CSI report, where the reference resource includes a TTI having the second TTI length and is identified based on a reporting configuration associated with the second TTI length, generating the CSI report based on the reference resource, and transmitting the CSI report during a reporting TTI and in response to the identified trigger.

A non-transitory computer-readable medium storing code for wireless communication is described. The code may include instructions executable by a processor to establish a configuration for communication utilizing a first TTI length and a second TTI length that is shorter than the first TTI length, identify a trigger for a CSI report associated with the second TTI length, identify a reference resource for the CSI report, where the reference resource includes a TTI having the second TTI length and is identified based on a reporting configuration associated with the second TTI length, generate the CSI report based on the reference resource, and transmit the CSI report during a reporting TTI and in response to the identified trigger.

In some examples of the method, apparatuses, and non-transitory computer-readable medium described herein, the identifying the trigger may include operations, features, means, or instructions for receiving a DCI message associated with the first TTI length including an aperiodic CSI reporting trigger in a first TTI. Some examples of the method, apparatuses, and non-transitory computer-readable medium described herein may further include operations, features, means, or instructions for receiving an aperiodic CSI reporting trigger configuration including a set of indexed entries, where at least one of the set of indexed entries indicates the trigger for CSI reporting for the second TTI length, where the DCI message includes an index to one of the set of indexed entries.

In some examples of the method, apparatuses, and non-transitory computer-readable medium described herein, the reporting configuration includes a configured TTI of the second TTI length that may be within the first TTI. In some examples of the method, apparatuses, and non-transitory computer-readable medium described herein, the reporting configuration includes a number of TTIs of the second TTI length for which the reference resource precedes the reporting TTI. In some examples of the method, apparatuses, and non-transitory computer-readable medium described herein, the identifying the trigger may include operations, features, means, or instructions for receiving a DCI message associated with the second TTI length including an aperiodic CSI reporting trigger.

In some examples of the method, apparatuses, and non-transitory computer-readable medium described herein, the aperiodic CSI reporting trigger triggers a second CSI report associated with the first TTI length to be transmitted with the CSI report in the reporting TTI, the reporting TTI having the second TTI length. In some examples of the method, apparatuses, and non-transitory computer-readable medium described herein, a first set of TTIs of the second TTI length may have a first number of symbols and a second set of TTIs of the second TTI length may have a second number of symbols, and where generating the CSI report based on the reference resource further may include operations, features, means, or instructions for generating the CSI report based on the first number of symbols for the first set of TTIs and the second set of TTIs.

In some examples of the method, apparatuses, and non-transitory computer-readable medium described herein, the generating the CSI report may include operations, features, means, or instructions for determining a channel quality indicator (CQI) associated with the second TTI length based on the reference resource. In some examples of the method, apparatuses, and non-transitory computer-readable medium described herein, the configuration for communication utilizes a third TTI length that may be shorter than the first TTI length and different than the second TTI length. In some examples of the method, apparatuses, and non-transitory computer-readable medium described herein, the generating the CSI report may include operations, features, means, or instructions for determining a second CQI associated with the third TTI length based on the reference resource. In some examples of the method, apparatuses, and non-transitory computer-readable medium described herein, the generating the CSI report may include operations, features, means, or instructions for determining that the reference resource may have the third TTI length and adjusting the reference resource to a TTI having the second TTI length that precedes the reference resource.

Some examples of the method, apparatuses, and non-transitory computer-readable medium described herein may further include operations, features, means, or instructions for determining the CQI may be based on an absence of control channel overhead, a predetermined amount of control channel overhead, an amount of control channel overhead in a TTI associated with the trigger, or a number of available resource elements determined from a ratio of the second TTI length to the first TTI length and a number of available resource elements for the first TTI length. Some examples of the method, apparatuses, and non-transitory computer-readable medium described herein may further include operations, features, means, or instructions for signaling a CSI processing capability, where the CSI processing capability indicates a first number of supported CSI processes for the first TTI length and a second number of supported CSI processes for the second TTI length.

Some examples of the method, apparatuses, and non-transitory computer-readable medium described herein may further include operations, features, means, or instructions for determining that a number of unreported CSI requests exceeds a CSI processing capability threshold and prioritizing the unreported CSI requests based on a timing of triggers associated with the unreported CSI requests, a timing of reporting TTIs associated with the unreported CSI requests, a length of TTIs associated with the unreported CSI requests, respective cell indices for a set of configured cells associated with the unreported CSI requests, respective traffic types associated with the unreported CSI requests, or a combination thereof. In some examples of the method, apparatuses, and non-transitory computer-readable medium described herein, unreported CSI requests for CSI reports associated with the second TTI length may be prioritized over unreported CSI requests for CSI reports associated with the first TTI length.

In some examples of the method, apparatuses, and non-transitory computer-readable medium described herein, the prioritizing the unreported CSI requests may include operations, features, means, or instructions for updating CSI measurements for a first subset of the unreported CSI requests and suppressing updating for CSI measurements for a second subset of the unreported CSI requests. Some examples of the method, apparatuses, and non-transitory computer-readable medium described herein may further include operations, features, means, or instructions for determining that a periodic CSI report for the first TTI length may be scheduled for the reporting TTI and transmitting the periodic CSI report for the first TTI length in the reporting TTI concurrently with the CSI report for the second TTI length.

Some examples of the method, apparatuses, and non-transitory computer-readable medium described herein may further include operations, features, means, or instructions for identifying a first ratio between an energy per resource element (EPRE) for a PDSCH associated with the first TTI length and a first reference signal EPRE and a second ratio between an EPRE for a PDSCH associated with the second TTI length and a second reference signal EPRE, where the generating the CSI report may be based on the second ratio.

In some examples of the method, apparatuses, and non-transitory computer-readable medium described herein, the second ratio may be equal to the first ratio. In some examples of the method, apparatuses, and non-transitory computer-readable medium described herein, the second ratio may be different than the first ratio. In some examples of the method, apparatuses, and non-transitory computer-readable medium described herein, the transmitting the CSI report may include operations, features, means, or instructions for transmitting a PUSCH punctured by the generated CSI report. In some examples of the method, apparatuses, and non-transitory computer-readable medium described herein, the first TTI length may be associated with a first traffic type and the second TTI length may be associated with a second traffic type.

In some examples of the method, apparatuses, and non-transitory computer-readable medium described herein, a first transmission mode may be configured for communications utilizing the first TTI length or the first traffic type and a second transmission mode that may be different from the first transmission mode may be configured for communications utilizing the second TTI length or the second traffic type. In some examples of the method, apparatuses, and non-transitory computer-readable medium described herein, the identifying the trigger for the CSI report associated with the second TTI length includes receiving an aperiodic CSI reporting trigger associated with the second traffic type. In some examples of the method, apparatuses, and non-transitory computer-readable medium described herein, a communications protocol associated with communications utilizing the second TTI length includes an ultra-low latency (ULL) protocol or an ultra-reliable low latency communications (URLLC) protocol.

DETAILED DESCRIPTION

Figure 1:
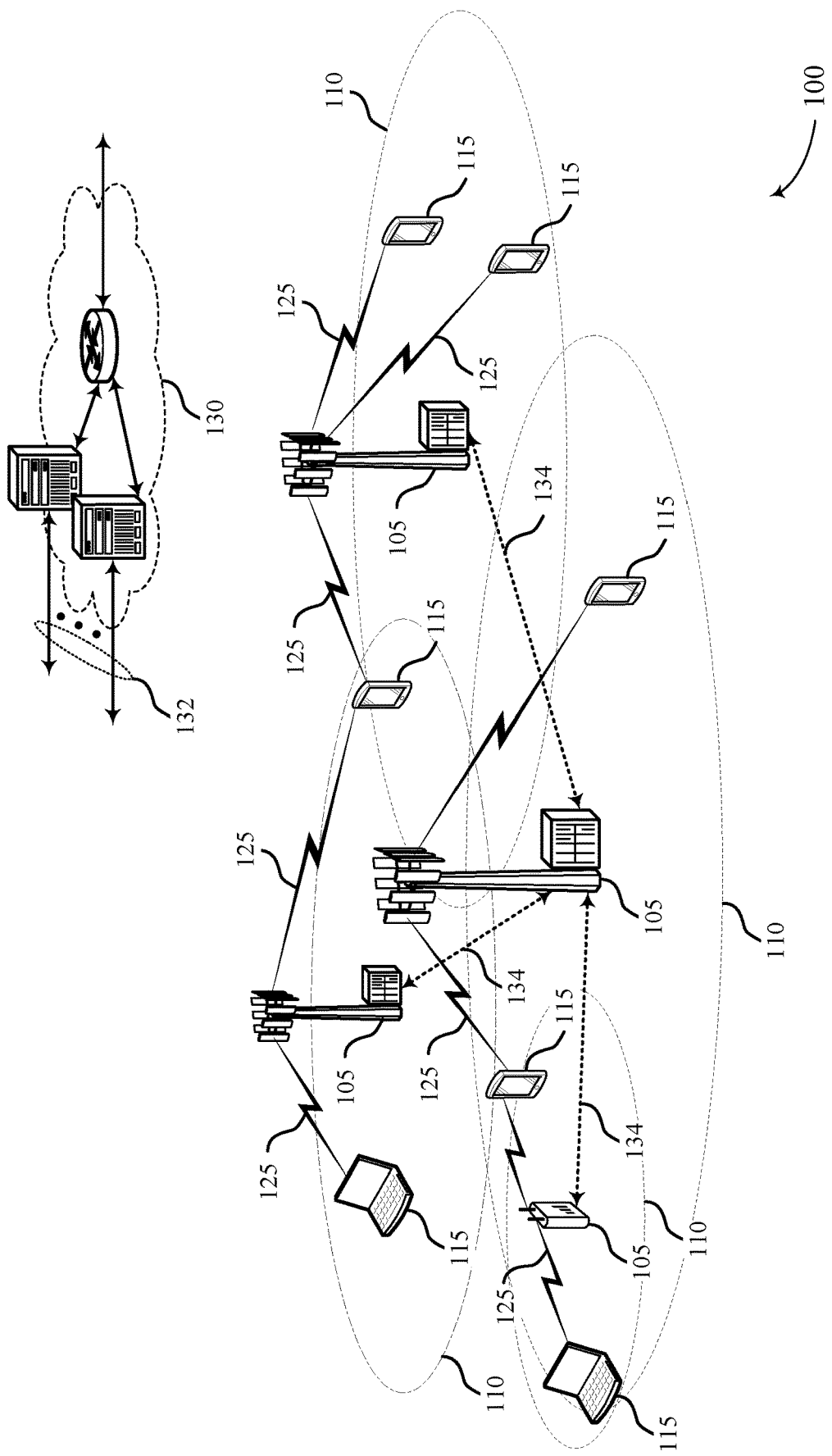
FIG. 1 illustrates an example of a system for wireless communication that supports CSI reporting for systems with multiple transmission time intervals in accordance with aspects of the present disclosure.

In a wireless communications system, channel state information (CSI) reporting may provide information regarding a communications link to a base station, where CSI may include information determined by a user equipment (UE) associated with reception of signals over the link (e.g., a rank indicator (RI), a precoding matrix indicator (PMI), a channel quality indicator (CQI), etc.). Additionally, wireless communications systems may provide multiple communications services, such as LTE services, ultra-low latency (ULL) services, or ultra-reliable low latency communication (URLLC) services. In some cases, different services may correspond to different transmission time intervals (TTIs). For example, a TTI (e.g., a first TTI length) corresponding to an LTE service may have a 1 ms TTI, whereas a ULL service or URLLC service may have a shortened TTI (sTTI) (e.g., a second TTI length) that has a duration of less than 1 ms (e.g., a slot, two symbols, etc.). A UE may transmit CSI reports to a base station to provide information required for subsequent scheduling and transmissions. Therefore, it may be beneficial to provide a method for providing CSI reporting to the base station corresponding to more than one type of service or TTI length.

CSI reports may be periodic or aperiodic (e.g., triggered by signaling from a base station). For example, a UE may receive a CSI trigger from a base station, which may initiate CSI measurements used for an aperiodic CSI report. In some examples, one trigger may initiate CSI measurements for multiple types of services or TTI lengths. For example, a downlink control information (DCI) message (e.g., a DCI message associated with 1 ms TTIs, or a legacy DCI) may trigger CSI reporting for 1 ms TTIs and trigger CSI reporting for sTTIs associated with ULL services, URLLC services, or both (which may be referred to herein as sCSI, or an sCSI report). In other examples, separate triggering may initiate CSI measurements for different types of services or different TTI lengths. For example, different DCI formats may be used (e.g., by a base station) to trigger CSI measurements over different TTI lengths (e.g., different DCI formats may request CSI reporting for different communication or traffic types utilizing different TTI lengths).

A UE may receive a trigger, identify a type of reporting, and then identify a reference resource during which CSI measurements can be taken. For ULL and/or URLLC CSI reports, the reference resource may be located within the subframe during which a trigger was received (e.g., an sTTI within the TTI in which the triggering DCI is received). Alternatively, the reference resource may be located closer to a subframe in which a CSI report will be transmitted, which may allow the reported CSI to be based on more recent CSI measurements. In some cases sTTIs may be of different lengths, and the UE may make assumptions regarding the number of symbols within an sTTI reference resource in order to achieve aligned CQI indexing.

A UE may also be limited to a number of CSI processes, where these processes may be shared across multiple carriers, or a single carrier, and may distribute the CSI processes across multiple services. Accordingly, the UE may prioritize unreported CSI requests if the number of received CSI requests exceeds the limit (e.g., the UE CSI processing capability). For example, the UE may prioritize CSI measurements according to the time the triggers associated with unreported CSI requests were received, according to the length of TTIs (e.g., the length of reference resources, such as sTTI length versus TTI length) associated with unreported CSI requests, etc. and perform the CSI measurements up to the CSI processing capability of the UE. Upon identifying a reference resource, and taking CSI measurements, the UE may generate a CSI report and transmit the report to the base station. Updated measurements associated with lower priority unreported CSI requests (e.g., requests associated with TTIs, which may have a lower priority than requests associated with sTTIs) that exceed the CSI processing capability of the UE may not be included in the CSI report (e.g., CSI measurements associated with lower priority CSI requests that exceed the UE CSI processing capability may not be updated). The CSI report may include updated measurements for any number of higher priority CSI requests that do not exceed the CSI processing capability of the UE. Updated measurements associated with higher priority unreported CSI requests may be included in the CSI report if they do not exceed the CSI processing capability.

Aspects of the disclosure are initially described in the context of a wireless communications system. Aspects of the disclosure are further illustrated by and described with reference to apparatus diagrams, system diagrams, and flowcharts that relate to CSI reporting for systems with multiple transmission time intervals.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. In some cases, wireless communications system 100 may support the establishment of a configuration for communication via a first traffic type utilizing first TTI and a second traffic type utilizing a second TTI length that is shorter than the first TTI length. In some cases, the first or second traffic type may be associated with one or several different TTI lengths. a UE may identify a trigger for a CSI report, identify a reference resource for the CSI report, and generate and transmit a CSI report based at least in part on the reference resource during a reporting TTI.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

A base station 105 may gather channel condition information from a UE 115 in order to efficiently configure schedule the channel. This information may be sent from the UE 115 in the form of CSI. CSI may contain an RI requesting a number of layers to be used for downlink transmissions (e.g., based on the antenna ports of the UE 115), a PMI indicating a preference for which precoder matrix should be used (based on the number of layers), and a CQI representing the highest modulation and coding scheme (MCS) that may be used. CQI may be calculated by a UE 115 after receiving predetermined pilot symbols, such as a common reference signal (CRS) or CSI-RS. The types of information included in the report determines a reporting type. Additionally, CSI may be periodic or aperiodic. That is, a base station 105 may configure a UE 115 to send periodic reports at regular intervals, and may also request additional reports as needed (e.g., using DCI). Aperiodic reports may include wideband reports indicating the channel quality across an entire cell bandwidth, UE-selected reports indicating a subset of the best sub-bands, or configured reports in which the subbands reported are selected by the base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105-a may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and a network device or core network 130 supporting radio bearers for user plane data. At the physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200$ $T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers (CCs) using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) CCs.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

In some examples, wireless communications system 100 may support CSI reporting for low latency TTIs and non-low latency TTIs. A UE 115 may establish a configuration for communication via a first traffic type (such as LTE) utilizing a first TTI length (e.g., a 1 ms TTI, or a subframe) and a second traffic type (such as ULL, URLLC, and the like) utilizing a second TTI length that is shorter than the first TTI length (e.g., a shortened TTI or sTTI). In some cases, each of the first traffic type or the second traffic type may be configured for supporting one or multiple different TTI lengths. The UE 115 may identify triggers for CSI reports associated with either the first traffic type or the second traffic type. The triggers for CSI reports may be separate (e.g., conveyed in control channels associated with the different traffic types) cross-type scheduled (e.g., a trigger for one traffic type may be received in a TTI or control channel associated with a different traffic type), or joint (e.g., triggers for multiple traffic types received in a TTI or control channel associated with one traffic type). For example, a UE may identify a trigger for a CSI report associated with the second traffic type (e.g., a request for a CSI measurement over the second TTI length), and may in turn identify a reference resource for CSI report corresponding to the second traffic type. The reference resource may include a TTI having the second TTI length and may be identified based on a reporting configuration associated with the second TTI length. For example, the reference resource may be a TTI of the second TTI length or may be a portion of a TTI of the first TTI length. The reference resource may be identified based on a reporting TTI for the CSI report. The UE 115 may generate the CSI report based on the reference resource, and may transmit the CSI report during the reporting TTI and in response to the identified trigger.

Figure 2:
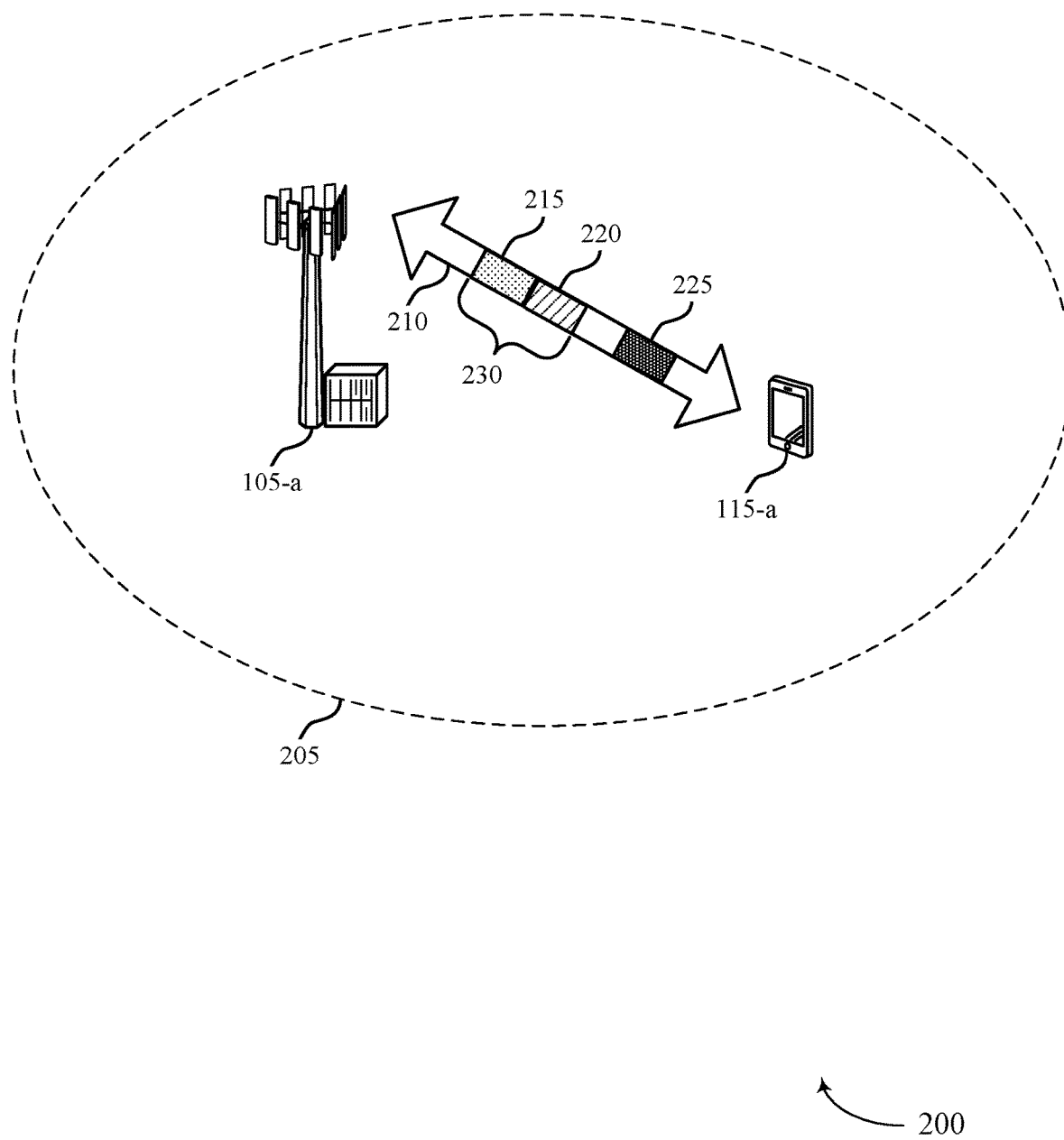
FIG. 2 illustrates an example of a wireless communication system that supports CSI reporting for systems with multiple transmission time intervals in accordance with aspects of the present disclosure.

FIG. 2 illustrates an example of a wireless communications system 200 that supports CSI reporting for systems with multiple transmission time intervals in accordance with various aspects of the present disclosure. In some examples, wireless communications system 200 may implement aspects of wireless communications system 100. Wireless communications system 200 may include a base station 105-*a* and a UE 115-*a*, which may be examples of the corresponding devices described with reference to FIG. 1. In some examples, Base station 105-*a* may be in communication with one or more UEs 115 within coverage area 205. For example, base station 105-*a* may be in communication with UE 115-*a* via bidirectional communication link 210. Base station 105-*a* and UE 115-*a* in wireless communications system 200 may support multiple services, such as LTE services, ULL services, and URLLC services. More than one service may be supported simultaneously. In some examples, different services may correspond to different TTIs. For example, a TTI corresponding to an LTE service may have a 1 ms TTI, whereas a ULL service or URLLC service may have a sTTI that has a duration of less than 1 ms.

Base station 105-*a* may send a request to acquire CSI information that may be utilized for subsequent scheduling and transmissions. Base station 105-*a* may accordingly transmit a trigger 230 to initiate CSI processes corresponding to one or more services. In some examples, trigger 230 may include one of a first trigger 215 or a second trigger 220. UE 115-*a* may receive the request and transmit a CSI report 225 in response to trigger 230. In some examples, all services (e.g., 1 ms LTE services, ULL services, or URLLC services) supported by wireless communications system 200 may be configured under a same transmission mode (TM). Alternatively, ULL or URLLC services may be configured according to a different TM than 1 ms LTE services. A timing and configuration utilized by UE 115-*a* to report CSI information corresponding to one service to base station 105-*a* may be utilized to report CSI information corresponding to additional services. For example, CSI reporting procedures utilized for reporting CSI information corresponding to LTE services may also be utilized to report CSI information corresponding to ULL or URLLC services and vice versa.

In some examples, base station 105-*a* may transmit separate triggers to trigger CSI reporting for different services. For example, base station 105-*a* may transmit a first trigger 215 that corresponds to one type of service to UE 115-*a*, which may trigger CSI reporting for LTE services (e.g., first trigger 215 may trigger a CSI report associated with the first TTI length). In some examples, first trigger 215 may be transmitted using DCI (e.g., trigger 215 may refer to a DCI format triggering CSI reporting for a reference resource of a first TTI length). As mentioned above, LTE services may correspond to a 1 ms TTI, and thus CSI reporting may be based on a 1 ms TTI. In some examples, base station 105-*a* may also transmit second trigger 220 to UE 115-*a*, which may trigger CSI reporting for ULL services or URLLC services (e.g., second trigger 220 may trigger a CSI report associated with the second TTI length). For instance, second trigger 220 may be transmitted using DCI associated with low latency communications (e.g., sDCI, or some other DCI format triggering CSI reporting for a reference resource of a second TTI length, such as a sTTI). In some examples, ULL services or URLLC services may correspond to the use of sTTIs, which may have a duration less than 1 ms. In such examples, UE 115-*a* may define a reference resource for ULL or URLLC CSI reporting that corresponds to an sTTI. The reference resource refers to one or more time periods during which measurements are taken by UE 115-*a*, and CSI report 225 may be based on measurements taken over the reference resource(s). In some examples, the reference resource may have a duration equal to full sTTI. Alternatively, the reference resource may have a duration that is equal to part of an sTTI (e.g., two symbols of a three symbol sTTI).

In some examples, base station 105-*a* may transmit a single trigger to initiate CSI reporting for respective services. The single trigger may be associated with a certain service type (e.g., LTE, ULL, URLLC), which may cause UE 115-*a* to initiate CSI reporting for more than one type of service. For example, trigger 215 associated with 1 ms LTE service may cause UE 115-*a* to initiate CSI reporting for LTE services and low latency services (e.g., ULL services and/or URLLC services). In such cases, UE 115-*a* may define an sTTI reference resource for taking CSI measurements after receiving trigger 215. UE 115-*a* may receive trigger 215 during one subframe, and transmit a CSI report during a different, subsequent subframe. UE 115-*a* may identify a reference resource for the ULL or URLLC CSI report based on the triggering TTI and sTTI timing, and may locate the reference resource in or between the subframe in which the trigger 215 is received and the subsequent subframe in which the CSI report is transmitted. As further described in FIG. 3, in some aspects the reference resource may be configured to be located after the triggering TTI such that the CSI report for ULL or URLLC is based on more recent measurements.

In some examples, base station 105-*a* may transmit an uplink grant to UE 115-*a*, which may include a trigger, such as trigger 215. The uplink grant may include a CSI triggering field, which may contain two bits. The interpretation of the bits may be indicated via RRC signaling, and the CSI trigger may be configured with a plurality of indexed entries. For example, in some cases, 00 may indicate that there is no CSI report, 01 may trigger a CSI report for the serving cell, 10 may trigger a CSI report for a first serving cell, and 11 may trigger a CSI report for a second serving cell. The RRC configuration may be extended such that each of the configurations signaled by the two bits in the defined CSI triggering field may be associated with one or both of CSI reporting for LTE 1 ms TTIs and CSI reporting for sTTIs (e.g., sCSI). For instance, a set of indexed entries associated with CSI reporting for both TTIs and sTTIs may be indicated via RRC signaling, and a bit value of 01 may trigger, for example, a CSI report on a serving cell in addition to an sCSI report on a secondary serving cell. Alternatively, the bit value of 01 may trigger a CSI report on the serving cell in addition to an sCSI report on the same serving cell. Other combinations and configurations of CSI and sCSI reporting associated with the two bits in the CSI triggering field may also be possible. Accordingly, the RRC configuration may enable UE 115-*a* to appropriately interpret the CSI triggering field for reporting CSI for different traffic types.

In some cases, UE 115-*a* may include CQI values in CSI report 225, and the CQI values may be based on sTTI reference resources when reporting CSI for low latency services. UE 115-*a* may be configured to report CQI to assist base station 105-*a* in choosing the proper MCS to use for subsequent transmissions (e.g., physical downlink shared channel (PDSCH) or shortened PDSCH (sPDSCH) transmissions). UE 115-*a* may report a CQI value corresponding to the MCS that ensures a desired block error rate (BLER) (e.g., BLER is less than or equal to 0.1). UE 115-*a* may assume a PDSCH over a reference measurement subframe, and may compute the CQI index. For services such as ULL or URLLC, different sTTIs may have different number of symbol periods. For example, sTTIs may be either two or three symbols, in some cases. For sPDSCH transmissions, a transport block size (TBS) over a three symbol sTTI may be scaled such that it is identical to that of the two symbol sTTI. In such examples, both two symbol sTTIs and three symbol sTTIs may follow the same processing timing. With the same TBS, the coding rate under a three symbol sTTI may be lower. Thus, depending on whether a two symbol or a three symbol reference measurement sTTI is used, a determined CQI index for the reference resource may be different.

In some examples, UE 115-a may determine CQI under the assumption that the reference measurement sTTI is a two symbol sTTI, or under the assumption that the reference measurement sTTI is a three-symbol sTTI. Alternatively, UE 115-a may determine CQI under the assumption that the reference measurement sTTI is always a two-symbol sTTI. In such examples, even in scenarios where the sTTI reference resource has three symbols, UE 115-a may still assume that only two symbols are available. In some examples, UE 115-a may determine that an sTTI reference resource corresponds to an sTTI having two symbols that is prior to the sTTI having three symbols. For example, UE 115-a may receive a CSI request during a subframe (subframe n), and identify an sTTI some threshold (n–k) prior to subframe n or sTTI n (e.g., n–4). The sTTI reference resource may be based on the threshold subframe or sTTI n–k. If n–k is an sTTI with three symbols, the UE 115-a may instead base the sTTI reference resource on sTTI n–5, thus basing the sTTI reference resource on an sTTI which has two symbols instead of three.

In some examples, a fixed assumption for shortened physical downlink control channel, (or sPDCCH) overhead with an sTTI may be applied. For example, in 1 ms LTE services (e.g., TTI services) UE 115-a assumes a three symbol physical downlink control channel (PDCCH) and a cyclic prefix (CP) length of non-MBSFN subframes for determining CQI. For ULL or URLLC services, UE 115-a may assume that there is no sPDCCH overhead, or may assume the same sPDCCH overhead of the triggering sTTI or of the reference resource sTTI. For example, when the same sPDCCH overhead is assumed, the reference resource sTTI may be understood to include a number of available REs that is in proportion to the sTTI length relative to the TTI length. In scenarios where UE 115-a assumes the same PDCCH and sPDCCH overhead, half the number of available REs of a subframe length TTI may be assumed for the reference resource for an sTTIs that is half the length of the subframe (e.g., a one-slot sTTI), or one sixth the number of available REs may be assumed for the reference resource when the UE 115-a is configured for an sTTI shorter than a certain number of symbols (e.g., two or three symbols). For example, UE 115-a may identify (e.g., via received DCI) a trigger for a CSI report associated with a sTTI. The UE 115-a may generate the CSI report based on a subset of symbols (e.g., 2 symbols) and generate the CSI report based on the subset of symbols (e.g., regardless of whether the sTTI is 2 symbols or 3 symbols), and assuming the same fixed overhead as is assumed for a TTI.

The number of CSI processes configurable at UE 115-a may be limited for a given service (e.g., LTE services). In some examples, however, UE 115-a may support additional services, such as ULL services or URLLC services. UE 115-a may have a constraint on a maximum number of concurrent CSI processes, which may be based on a capability of UE 115-a. For example, UE 115-a may be able to support a certain number of CSI processes, and these CSI processes may be shared or distributed across multiple services (e.g., UE 115-a may be capable of supporting a certain number of total CSI processes regardless of the service or reference resource TTI length, or UE 115-a may have separate or different CSI processing capabilities for each supported service). That is, capabilities for CSI processes (e.g., CSI reports or CSI measurements associated with the first TTI length) and capabilities for sCSI processes (e.g., CSI reports or CSI measurements associated with the second TTI length) may be defined, accounted for, reported, etc. by UE 115-a jointly or separately. For example, UE 115-a may determine a number of unreported CSI requests exceeds a common CSI processing capability threshold and may prioritize the unreported CSI requests according to techniques described here. Alternatively, UE 115-a may determine that CSI requests associated with the first TTI length (or second TTI length) exceed a CSI processing capability for CSI reporting associated with the first TTI length (or associated with the second TTI length), and may prioritize the unreported CSI requests associated with the first TTI length (or associated with the second TTI length). Where the joint or separate CSI processing capability threshold of the UE 115-a is exceeded, unreported CSI requests (e.g., CSI requests associated with CSI measurements that have yet to be performed or reported by UE 115-a) associated with lower priority may be dropped (e.g., not be included in the CSI report), or may be reported using previous CSI measurements (e.g., the reported CSI may not be updated).

The constraint may be applied per CC, over all CCs, or both. For example, if the CSI process constraint is ten CSI processes and applied across five CCs, the CSI processes may be applied over the five CCs with two processes per CC, or the ten CSI processes may be applied dynamically across the five CCs. In one example, UE 115-a may apply the constraint such that ten CSI processes may be performed on a first CC, and zero CSI processes may be performed on a second, third, fourth, and fifth CC. Or, in another example, UE 115-a may apply the constraint such that five CSI processes may be associated with a first CC, five CSI processes may be associated with a second CC, and zero CSI processes may be associated with a third, fourth, and fifth CC, etc. Additionally or alternatively, a constraint may be applied per CC such that no more than two CSI processes may be associated with each CC. Alternatively, the constraint may apply across multiple CCs. In some examples, the constraint may be applied in a combination of the dynamic assignment across multiple or all CCs, and per CC.

UE 115-a may support one or more capabilities regarding the number of CSI processes it can support for given services. For instance, capabilities may be independently signaled for 1 ms CSI and ULL or URLLC CSI, and multiple capabilities may be signaled. For example, UE 115-a may indicate one or more of the following capabilities as applied to a 1 ms CSI and at least one of ULL or URLLC CSI: 12 CSI processes for 1 ms CSI; 10 CSI processes for 1 ms CSI+5 CSI processes for ULL/URLLC; 5 CSI processes for 1 ms CSI+15 CSI processes for ULL/URLLC; and 0 CSI processes for 1 ms CSI+25 CSI processes for ULL/URLLC. In some examples, support for one or more of a set of predefined capabilities may be signaled as a bitmap. It is understood that these are only illustrative examples of combinations of different CSI processes that may be supported for different service types, and a different number of CSI processes for each service, and combinations thereof, may be supported by UE 115-a and signaled to base station 105-a. Base station 105-a may receive signaling for these or other predefined sets of capabilities from UE 115-a and determine how many, if any, CSI processes UE 115-*a* is capable of supporting. Base station 105-*a* may transmit CSI requests to UE 115-*a*, which may be based in part on the received capabilities.

In some examples, UE 115-*a* may prioritize CSI processes based, at least in part, on a triggering budget. As described in more detail below, the triggering budget may correspond to a number of triggered CSI reports that UE 115-*a* may be able to concurrently process (e.g., provide up-to-date information for), whereas for any triggered CSI reports that exceed the triggering budget, stale information (e.g., information determined based on measurements made prior to the trigger) may be provided. Prioritization may be performed for determining which CSI processes to update when the triggering budget is exceeded.

In some examples, an aperiodic CSI report may be triggered over a CC at the same time as periodic CSI reporting is scheduled. In such cases, if periodic CSI and aperiodic CSI are both triggered for 1 ms LTE services for a given CC for reporting in the same subframe, the periodic CSI for all CCs may be dropped. In some examples, in a wireless communications system that supports ULL services or URLLC services, aperiodic CSI reporting for 1 ms LTE services may collide with periodic CSI reporting for ULL services or URLLC services. In such cases, the system may support aperiodic CSI reporting for 1 ms LTE services and periodic CSI reporting within the same subframe, which may enhance the service availability for low latency communication by maintaining more up to date CSI information. In some examples, additional priority rules may be defined. For example, a periodic or aperiodic URLLC CSI report may take precedence over a ULL periodic or aperiodic CSI report and a ULL or URLLC periodic or aperiodic CSI report may take precedence over a 1 ms LTE periodic or aperiodic CSI report. In some examples, a CSI process configuration may include an indication of a ratio between PDSCH and CSI-RS energy per resource element (EPRE). In such cases, a first ratio may indicate the ratio between PDSCH and CSI-RS EPRE for 1 ms LTE services, while a second ratio may indicate the sPDSCH and CSI-RS EPRE for ULL services and/or URLLC services. Alternatively, the sPDSCH and CSI-RS EPRE for ULL services and/or URLLC services may be the same as the ratio between PDSCH and CSI-RS EPRE for 1 ms LTE services.

Figure 3:
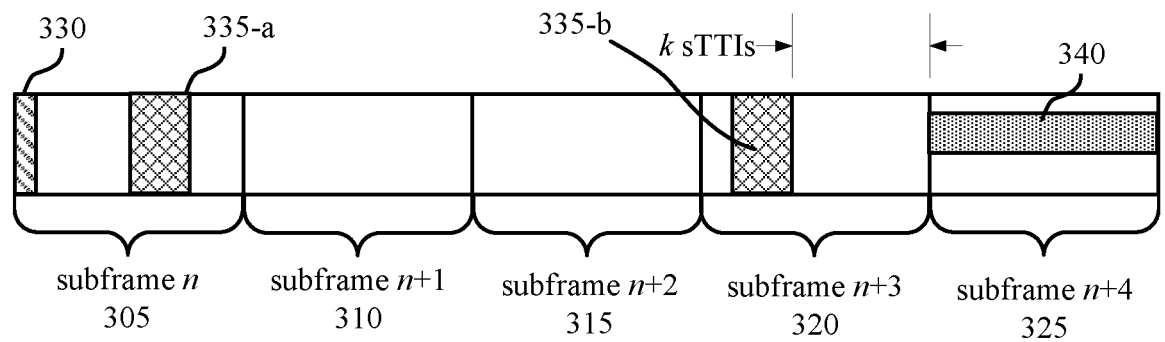
FIG. 3 illustrates an example of a subframe structure 300 that supports channel state information (CSI) reporting for systems with multiple transmission time intervals in accordance with aspects of the present disclosure.

FIG. 3 illustrates an example of a subframe structure 300 that supports CSI reporting for systems with multiple transmission time intervals in accordance with various aspects of the present disclosure. In some examples, subframe structure 300 may implement aspects of wireless communications system 100. Subframe structure 300 may be utilized by a base station 105-*a* and a UE 115-*a*, which may be examples of the corresponding devices described with reference to FIGS. 1-2. In some examples, a base station 105 may transmit a trigger to initiate CSI reporting for different services. The trigger may be included in DCI information (e.g., in an uplink grant). As described above, the CSI trigger may initiate CSI reporting for more than one type of service. For example, the CSI trigger may be associated with LTE services (e.g., using legacy DCI grants such as DCI formats 0 or 4), but may initiate CSI reporting for a combination of LTE services, ULL services, or URLLC services (e.g., based on preconfigured indexing for CSI request fields).

A UE 115 may receive requests to provide CSI during one of a plurality of subframes n (e.g., subframe n 305 through subframe n+4 325). For example, UE 115 may have periodic CSI reports corresponding to LTE services and other services such as ULL and/or URLLC services scheduled during subframe n 305 through subframe n+4 325, or may receive a trigger for aperiodic CSI. For instance, the UE 115 may receive an aperiodic CSI request 330 at the beginning of subframe n 305 in DCI. For 1 ms LTE CSI reporting, the UE 115 may take CSI measurements during subframe n 305, and may transmit CSI report 340 for the 1 ms TTI during subframe n+4 325.

In some cases, the UE 115 may also trigger CSI reporting for ULL or URLLC based on aperiodic CSI request 330. In such cases, the UE 115 may determine an sTTI reference resource 335 for taking CSI measurements for aperiodic CSI request 330. The sTTI reference resource 335 may correspond to an sTTI duration or a portion of the sTTI duration for the related service (e.g., where a 1-symbol sTTI can be used for ULL or URLLC). The sTTI reference resource 335 may be determined based on the triggering TTI 305, as well as a configuration for sTTI CSI reporting for an aperiodic trigger received via 1 ms LTE DCI. For example, sTTI reference resource 335-*a* may be configured within subframe n 305 (e.g., sTTI reference resource 335-*a* may be configured as the Mth sTTI within subframe n). Alternatively, sTTI reference resource 335-*b* may be configured such that it is located closer to reporting subframe n+4 325, instead of within subframe n 305. For example, sTTI reference resource 335-*b* may be located within subframe n+2 315 or subframe n+3 320 (e.g., sTTI reference resource 335-*a* may be configured as the Mth sTTI within subframe n+1 310, subframe n+2 315, or subframe n+3 320).

Alternatively, sTTI reference resource 335 may be chosen based on a processing timeline of a preconfigured number of sTTIs (e.g., a processing timeline of k sTTIs). For instance, an sTTI that is k sTTIs prior to subframe n+4 325 may be selected as sTTI reference resource 335-*b*. In such examples, a smaller amount of time may pass between the sCSI measurements taken during sTTI reference resource 335-*b* and the transmission of CSI report 340 that includes the sCSI report. That is, the information acquired during sTTI reference resource 335-*b* may be more current than for sTTI reference resource 335-*a*. However, the processing timeline may take into account physical uplink shared channel (PUSCH) encoding related to CSI report 340. For example, if PUSCH encoding for CSI report 340 is in progress or has already been completed, for example, during subframe n+3, sCSI measurements taken during an sTTI reference resource 335-*b* during subframe n+3 may not be included in the encoded CSI report 340. Thus, the sCSI measurements taken during sTTI reference resource 335 for the corresponding sCSI report may not be transmitted on the PUSCH. Thus, the UE 115 may identify sTTI reference resource 335-*b* (e.g., via indicating a processing capability to a base station 105) such that it is closer to the reporting subframe n+4 325 than subframe n (to allow for current measurements), but far enough away from reporting subframe n+4 to ensure that measurements are taken prior to PUSCH encoding. For example, if the UE 115 determines that encoding related to CSI report 340 takes place during subframe n+3, but that sCSI measurements taken during subframe n 305 are stale or outdated, then the UE 115 may identify sTTI reference resource 335-*b* as being within subframe n+2. The location of sTTI reference resource 335 may be determined on a case-by-case basis at the UE 115 by indicating a number of sTTIs or subframes for the sTTI reference resource 335 prior to the reporting subframe n+4 325. Alternatively, the location of sTTI reference resource 335 may be preconfigured.

In some examples, an sCSI report may puncture the PUSCH associated with CSI report 340. Puncturing may allow the UE 115 to transmit the sCSI report for a given sTTI reference resource even if the PUSCH encoding process has begun or finished. In such cases, the UE 115 may locate sTTI reference resource 335 closer to reporting subframe n+4. For example sTTI reference resource 335-*b* may be located in subframe n+3.

In some examples, the UE 115 may not be scheduled for uplink transmissions associated with low latency services for some amount of time. However, the communications link used for the low latency services at the UE 115 may be kept alive or maintained by triggering an sCSI report using DCI associated with 1 ms services. In such cases, sTTI reference resource 335 may be located within subframe n 305, or sTTI reference resource 335 may be within another sTTI, as described above.

Figure 4:
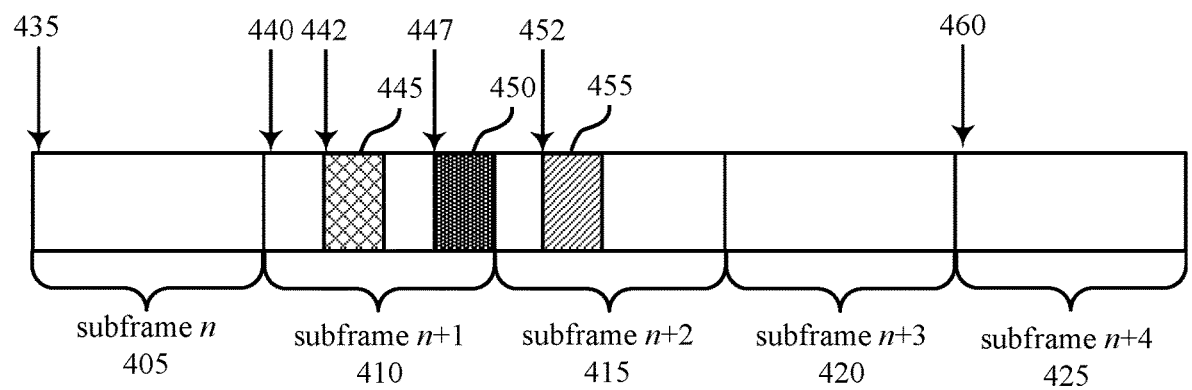
FIG. 4 illustrates an example of a subframe structure 400 that supports CSI reporting for systems with multiple transmission time intervals in accordance with aspects of the present disclosure.

FIG. 4 illustrates an example of a subframe structure 400 that supports CSI reporting for systems with multiple transmission time intervals in accordance with various aspects of the present disclosure. In some examples, subframe structure 400 may implement aspects of wireless communications system 100. Subframe structure 400 may include a base station 105 and a UE 115, which may be examples of the corresponding devices described with reference to FIGS. 1-3. In some examples, a UE 115 may prioritize CSI processes. The prioritization may be based, at least in part, on a triggering budget, or other methods, as discussed with reference to FIG. 2.

A UE 115 may receive periodic CSI requests and aperiodic CSI requests across a plurality of subframes, such as subframe n 405 through subframe n+4 425. For example, a UE 115 may receive 1 ms CSI request 0 435 at the beginning of subframe n 405. In some examples, the UE 115 may take CSI measurements during subframe n 405, and may transmit a 1 ms CSI report 0 460 during subframe n+4 425. The UE 115 may receive 1 ms CSI request 1 440 at the beginning of subframe n+1 410, and may make additional CSI measurements during subframe n+1 410 to be transmitted during some future subframe (e.g., subframe n+5 (not shown)). An uplink grant that triggers the 1 ms CSI request 1 440 may also trigger an aperiodic sCSI request 0 442 and the UE 115 may identify sTTI reference resource 445 during an sTTI of subframe n+1 410 to take sCSI measurements. The UE 115 may receive an aperiodic sCSI request 1 447 during a second portion of subframe n+1 410, and may identify sTTI reference resource 450 to take sCSI measurements. Additionally, the UE 115 may receive an aperiodic sCSI request 2 452 during subframe n+2 415, and may identify sTTI reference resource 455 to take sCSI measurements. Alternatively, one or more of sTTI reference resources 445, 450, or 455 may be identified based on a configuration for periodic sCSI reporting.

Each of identified sTTI reference resources 445, 450, and 455, may be identified and located by the UE 115 such that sCSI measurements taken during the corresponding subframe may be completed with sufficient time to encode the sCSI measurements in an uplink channel (e.g., PUSCH when the sCSI report is triggered by DCI associated with 1 ms service, or sPUSCH when the sCSI report is triggered by sDCI). For example, if sCSI request 0 442 is triggered by 1 ms CSI request 1 440, the sCSI report based on measurements taken during sTTI reference resource 445 may be transmitted during some subsequent subframe (e.g., subframe n+5) along with CSI measurements taken in response to 1 ms CSI request 1 440. Alternatively, if sCSI request 0 442 is triggered by an independent sCSI reporting request, measurements taken during sTTI reference resource 445 may be transmitted in a subsequent sTTI that is referenced to the sTTI having the independent sCSI request (e.g., 4, 8, 12, or more sTTIs after sCSI request 0 442). Thus, upon receiving sCSI request 2 452 and identifying sTTI reference resource 455, the UE 115 may have received a total of five CSI or sCSI requests corresponding to multiple services, and each of the four CSI/sCSI processes prior to receiving sCSI request 2 452 may still be in process (e.g., the UE 115 may have five unreported CSI/sCSI processes after receiving sCSI request 2 452).

As discussed above, a UE 115 may apply a triggering budget by generating a constraint to limit CSI/sCSI reports to the CSI/sCSI processes threshold. For example, the UE 115 may be configured with a triggering budget of four CSI/sCSI processes. When the number of unreported CSI/sCSI processes is more than what the CSI/sCSI triggering budget allows (e.g., four), the UE 115 may apply a prioritization scheme to select which CSI/sCSI reports will be executed with updated or current measurements, and which CSI reports will be based on stored (e.g., outdated) information.

A UE 115 may prioritize CSI/sCSI processes based on dynamic assignment. For example, the UE 115 may assign priority on a first come first serve basis. In such cases, the UE 115 may select CSI request 0 435, CSI request 1 440, sCSI request 0 442, and sCSI request 1 447, and may transmit CSI reports based on current measurements based on the order in which the CSI requests arrived. In such an example, an sCSI report corresponding to sCSI request 2 452 may be transmitted based on prior measurements (e.g., not updated based on sTTI reference resource 455).

In some examples, a UE 115 may prioritize CSI/sCSI processes based, at least in part, on priority rules. The priority rules may be dynamically assigned based on conditions such as channel conditions, cell load, or other characteristics. Alternatively, the priority rules may be predefined. The rules may prioritize CSI/sCSI processes based on traffic type. For example, sCSI for URLLC services may be defined as being prioritized over sCSI for ULL services, and sCSI for ULL services may be defined as being prioritized over CSI for 1 ms LTE services. Additionally or alternatively, CC indexes may be used for prioritizing CSI/sCSI processes. For example, CCs having cell indices that are lower may be prioritized for CSI/sCSI processes over CCs having higher cell indices. In such cases, the UE 115 may select which CSI process should be based on updated measurements and which processes should be based on prior measurements (e.g., stored data from previous reference resources), based on the defined prioritization.

For example, sCSI request 0 442 corresponding to sTTI reference resource 445 may be an sTTI CSI request corresponding to ULL services while sCSI request 1 447 and sCSI request 2 452, corresponding to sTTI reference resources 450 and 455, may be sCSI requests corresponding to URLLC transmissions. In such an example, the UE 115 may prioritize sCSI request 1 447 and sCSI request 2 452 as being highest priority, followed by sCSI request 0 442. Each of the three CSI reports corresponding to these three CSI requests may be based on updated information (e.g., new measurements for sTTI reference resources 445, 450, and 455). The last priority may be 1 ms CSI requests 0 435 and 1 440. The UE 115 may select one of these randomly, or based on a scheme (e.g., first come first serve). For example, the CSI report corresponding to 1 ms CSI request 0 may be based on updated information based on arrival time (or some other determining characteristic). Thus, each of the four prioritized CSI reports may be based on updated information. However, the triggering budget may have been met at four CSI reports, and the UE 115 may transmit a CSI report corresponding to 1 ms CSI request 1 that is based on stored information (e.g., measurements based on previous reference resources), so as not to violate the triggering budget.

Figure 5:
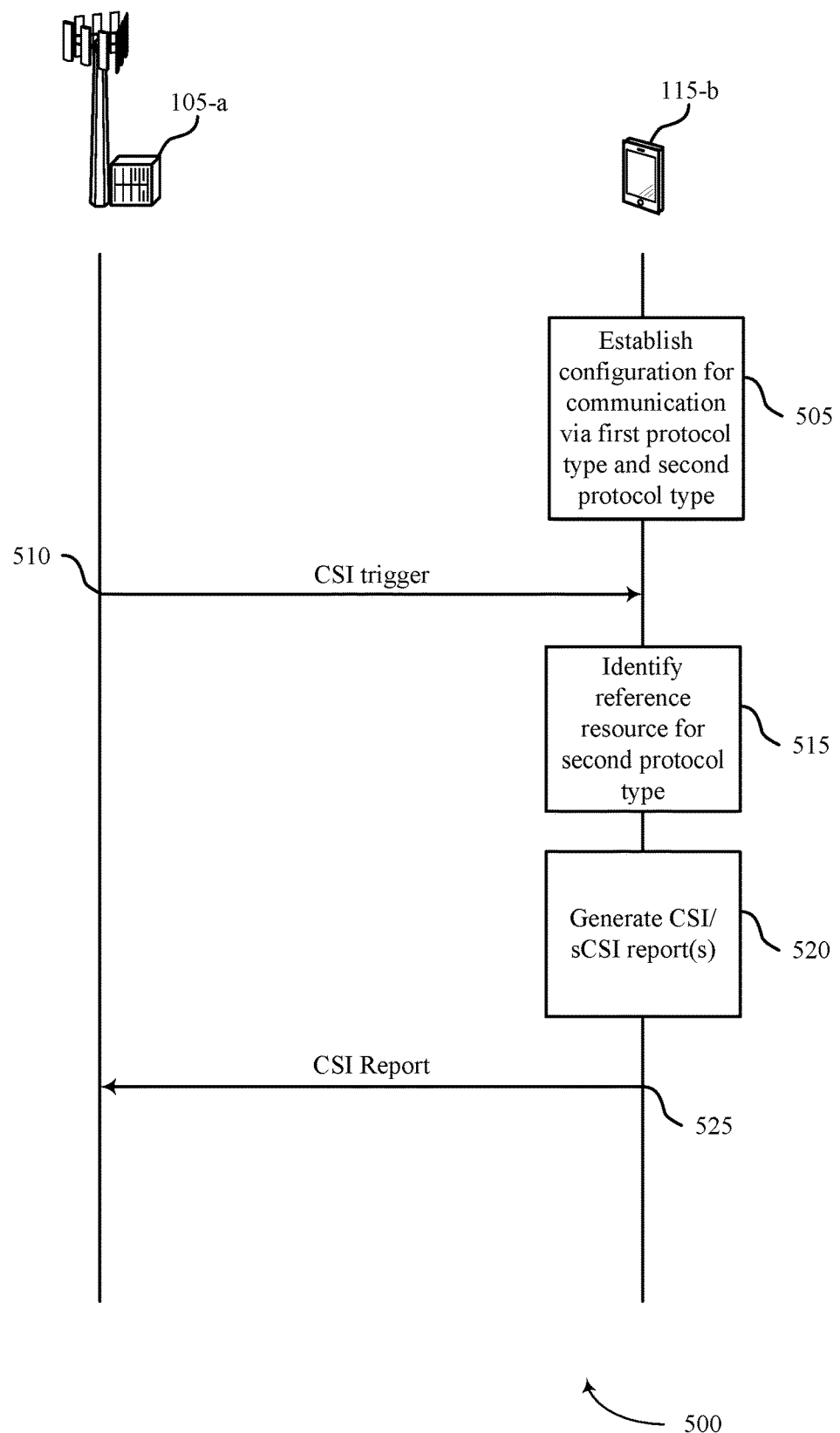
FIG. 5 illustrates an example of a process flow that supports CSI reporting for systems with multiple transmission time intervals in accordance with aspects of the present disclosure.

FIG. 5 illustrates an example of a process flow 500 that supports CSI reporting for systems with multiple transmission time intervals in accordance with various aspects of the present disclosure. In some examples, process flow 500 may implement aspects of wireless communications system 100. Process flow 500 may include a base station 105-b and a UE 115-b, which may be examples of the corresponding devices described with reference to FIGS. 1-4.

At 505, base station 105-b may establish a configuration for communication via a first traffic type utilizing a first TTI length (e.g., 1 ms TTI) and a second traffic type utilizing a second TTI length that is shorter than the first TTI length. For example, UE 115-b may support multiple services, such as 1 ms LTE services, ULL services, and URLLC services, each of which may correspond to a different protocol, and each of which may correspond to a different TTI length. For example, some LTE services may correspond to a TTI length of 1 ms. These types of services may correspond to a first traffic type. Alternatively, ULL services and URLLC may correspond to a second traffic, and such services may correspond to a second TTI length that is shorter than 1 ms (e.g., sTTI). In some cases, one traffic type may even support multiple TTI lengths (e.g., ULL or URLLC may support sTTIs of multiple lengths such as 2 symbol sTTIs, 3 symbol sTTIs, and/or slot-based sTTIs). In some examples, UE 115-b may signal a CSI processing capability, indicating to base station 105-b one or more supported configurations including a first number of supported CSI processes for the first traffic type (e.g., CSI processes) and a second number of supported CSI processes for the second traffic type (e.g., sCSI processes). The first traffic type may be configured for operation according to a first TM and the second traffic type may be configured for operation according to a second TM that is different from the first TM. Alternatively, TM modes may be configured for each TTI length (e.g., each different TTI length separately configured with a TM mode).

At 510, base station 105-a may transmit a CSI trigger. UE 115-b may identify the transmitted CSI trigger. In some examples, UE 115-b may receive a DCI message associated with the first TTI length, which may include an aperiodic CSI reporting trigger in a first TTI. In some examples, UE 115-b may also receive an aperiodic CSI reporting trigger configuration which includes a plurality of indexed entries. At least one of the plurality of indexed entries may indicate the trigger for CSI reporting for the second TTI length, and the DCI message may include an index to one of the plurality of indexed entries. The UE 115-b may also be configured with an sCSI reporting configuration that may configure an sTTI within the first TTI as the reference resource for sCSI reporting. Alternatively, the sCSI reporting configuration may indicate a number of sTTIs by which the reference resource precedes the reporting TTI. For instance, if the processing timing associated with sTTIs is k=6, an sTTI that is six sTTIs prior to the reporting TTI may be determined to be the reference resource. In some examples, UE 115-b may receive a DCI message associated with the second traffic type (e.g., sDCI) comprising an aperiodic reporting trigger. The aperiodic reporting trigger may trigger reporting of CSI and sCSI in the reporting sTTI.

At 515, UE 115-b may identify an sTTI reference resource for the sCSI report. The reference resource may be an sTTI and may be identified based at least in part on the TTI in which a trigger is received, a number of TTIs of the first TTI length between the trigger and a reporting TTI, or the sCSI reporting configuration. The sCSI reporting configuration may indicate an sTTI or portion of an sTTI within the TTI in which a trigger is received, a number of TTIs prior to the reporting TTI for locating the sTTI reference resource, a number of sTTIs prior to the reporting TTI, or a combination thereof.

At 520, UE 115-b may generate CSI/sCSI report(s) based at least in part on the reference resource(s). In some examples, the second traffic type may utilize multiple sTTI lengths (e.g., the second TTI length and a third TTI length that is shorter than the first TTI length and different than the second TTI length). In such examples, generating the sCSI report may include determining a CQI associated with the second TTI length based on the reference resource. Generating the sCSI report may further include determining a second CQI associated with the third TTI length based on the reference resource. Generating the sCSI report may further include determining that the reference resource has the third TTI length, and adjusting the reference resource to a TTI having the second TTI length that precedes the reference resource.

In some examples, generating the sCSI report may be based at least in part on an absence of control channel overhead, a predetermined amount of control channel overhead, or an amount of control channel overhead in an sTTI associated with the trigger. In some examples, UE 115-b may determine that a number of unreported CSI/sCSI requests exceeds a threshold, and may prioritize generation of CSI/sCSI reports for the unreported CSI/sCSI requests based at least in part on a timing of triggers associated with the unreported CSI/sCSI requests or traffic type priorities associated with the unreported CSI/sCSI requests.

In some examples, UE 115-b may identify a first ratio between an EPRE for a PDSCH for the first traffic type and a first reference signal EPRE, and may also identify a second ratio between an EPRE for a PDSCH for the second traffic type and a second reference signal EPRE, the second ratio being different than the first ratio. Generating the CSI report may be based at least in part on the second ratio.

At 525, UE 115-b may transmit the CSI report during the reporting TTI and in response to the identified trigger. In some examples, the CSI report may include a periodic CSI report for the second traffic type. In some examples, UE 115-b may transmit the CSI report using PUSCH (e.g., in cases where a legacy or 1 ms DCI is used to trigger CSI reports for both 1 ms TTIs and sTTIs), which may, in some cases, be punctured by the generated CSI report (e.g., periodic or aperiodic) for the second traffic type. Additionally or alternatively, CSI and sCSI may be triggered via DCI and sDCI, respectively, and the CSI and sCSI may be transmitted using PUSCH and sPUSCH, respectively.

In some cases, UE 115-b may determine that an aperiodic CSI report for the first traffic type is scheduled for the reporting TTI, and transmit the aperiodic CSI report for the first traffic type in the reporting TTI concurrently with the periodic CSI report for the second traffic type. For example, an aperiodic CSI for 1 ms services may be sent simultaneously with a periodic CSI for low latency services (e.g., a periodic sCSI for ULL/URLLC). In some cases, the aperiodic CSI and periodic sCSI may be sent over different CCs.

Figure 6:
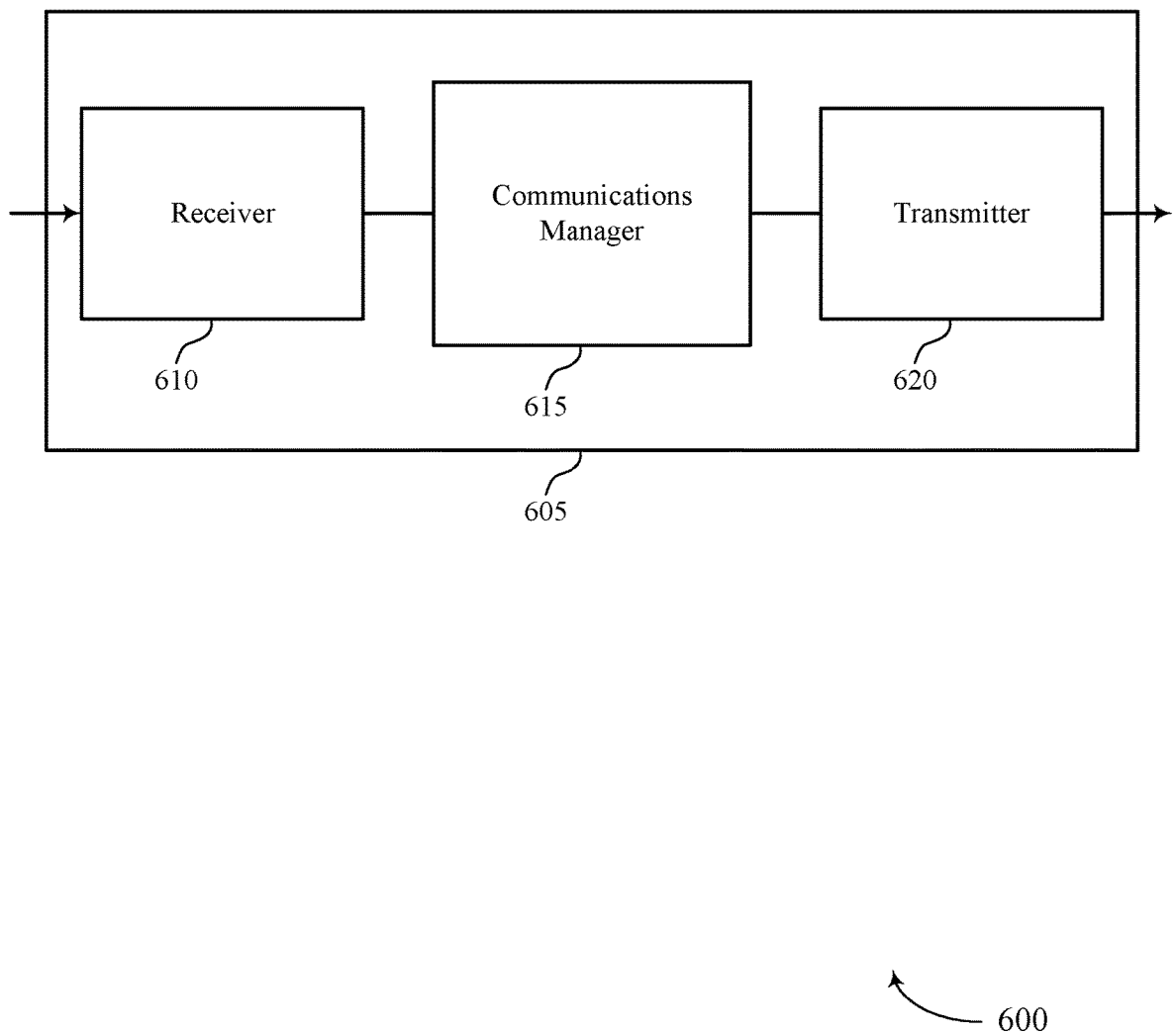
FIGS. 6 through 8 show block diagrams of a device that supports CSI reporting for systems with multiple transmission time intervals in accordance with aspects of the present disclosure.

FIG. 6 shows a block diagram 600 of a wireless device 605 that CSI reporting for systems with multiple transmission time intervals in accordance with aspects of the present disclosure. Wireless device 605 may be an example of aspects of a UE 115 as described herein. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to CSI reporting for systems with multiple transmission time intervals, etc.). Information may be passed on to other components of the device. The receiver 610 may be an example of aspects of the transceiver 935 described with reference to FIG. 9. The receiver 610 may utilize a single antenna or a set of antennas.

Communications manager 615 may be an example of aspects of the communications manager 915 described with reference to FIG. 9. Communications manager 615 and/or at least some of its various sub-components may be implemented in hardware, software executed by a processor, firmware, or any combination thereof. If implemented in software executed by a processor, the functions of the communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 615 and/or at least some of its various sub-components may be physically located at various positions, including being distributed such that portions of functions are implemented at different physical locations by one or more physical devices. In some examples, communications manager 615 and/or at least some of its various sub-components may be a separate and distinct component in accordance with various aspects of the present disclosure. In other examples, communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 615 may establish a configuration for communication via a first traffic type utilizing a first TTI length and a second traffic type utilizing a second TTI length that is shorter than the first TTI length, identify a trigger for a CSI report associated with the second traffic type, identify a reference resource for the second traffic type for the CSI report, where the reference resource includes a TTI having the second TTI length and is identified based on a reporting configuration associated with the second TTI length, generate the CSI report based on the reference resource, and transmit the CSI report during a reporting TTI and in response to the identified trigger.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
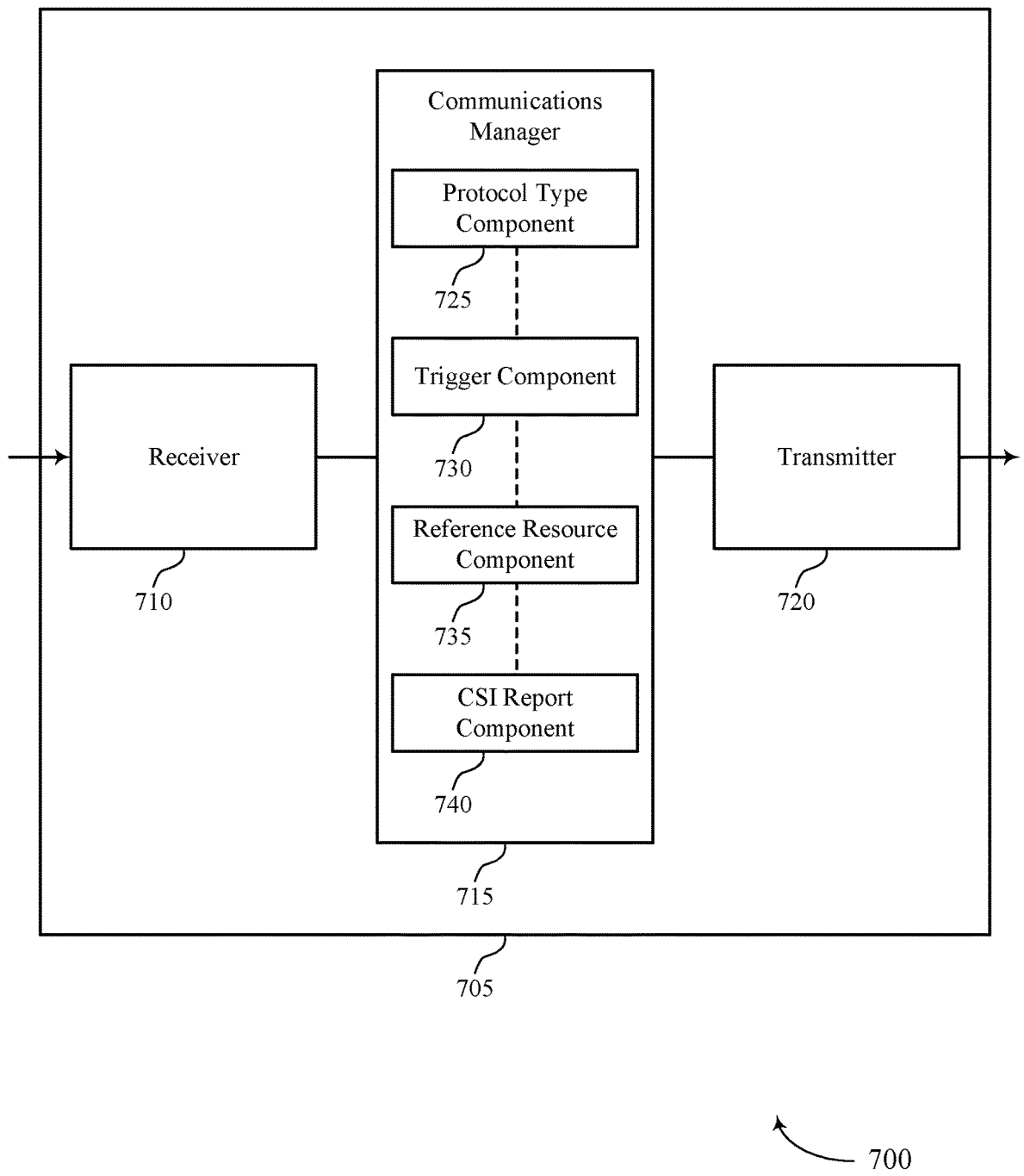

FIG. 7 shows a block diagram 700 of a wireless device 705 that supports CSI reporting for systems with multiple transmission time intervals in accordance with aspects of the present disclosure. Wireless device 705 may be an example of aspects of a wireless device 605 or a UE 115 as described with reference to FIG. 6. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to CSI reporting for systems with multiple transmission time intervals, etc.). Information may be passed on to other components of the device. The receiver 710 may be an example of aspects of the transceiver 935 described with reference to FIG. 9. The receiver 710 may utilize a single antenna or a set of antennas.

Communications manager 715 may be an example of aspects of the communications manager 915 described with reference to FIG. 9. Communications manager 715 may also include traffic type component 725, trigger component 730, reference resource component 735, and CSI report component 740.

Traffic type component 725 may establish a configuration for communication via a first traffic type utilizing a first TTI length and a second traffic type utilizing a second TTI length that is shorter than the first TTI length. In some cases, the second traffic type utilizes the second TTI length and a third TTI length that is shorter than the first TTI length and different than the second TTI length. In some cases, a first transmission mode is configured for the first traffic type and a second transmission mode that is different from the first transmission mode is configured for the second traffic type. In some cases, the second traffic type includes a ULL protocol or a URLLC protocol.

Trigger component 730 may identify a trigger for a CSI report associated with the second traffic type and receive an aperiodic CSI reporting trigger configuration including a set of indexed entries, where at least one of the set of indexed entries indicates the trigger for CSI reporting for the second traffic type (e.g., for the second TTI length), where the DCI message includes an index to one of the set of indexed entries. In some cases, the identifying the trigger includes: receiving a DCI message associated with the first traffic type including an aperiodic CSI reporting trigger in a first TTI. In some cases, the reporting configuration includes a configured TTI of the second TTI length that is within the first TTI. In some cases, the reporting configuration includes a number of TTIs of the second TTI length for which the reference resource precedes the reporting TTI. In some cases, the identifying the trigger includes: receiving a DCI message associated with the second traffic type including an aperiodic CSI reporting trigger. In some cases, the aperiodic CSI reporting trigger triggers a second CSI report associated with the first traffic type to be transmitted with the CSI report in the reporting TTI, the reporting TTI having the second TTI length.

Reference resource component 735 may identify a reference resource for the second traffic type for the CSI report, where the reference resource includes a TTI having the second TTI length and is identified based on a reporting configuration associated with the second TTI length. In some examples, reference resource component 735 may adjust the reference resource to a TTI having the second TTI length that precedes the reference resource.

CSI report component 740 may generate the CSI report based on the reference resource, transmit the CSI report during a reporting TTI and in response to the identified trigger, determine that an aperiodic CSI report for the first traffic type is scheduled for the reporting TTI, and transmit the aperiodic CSI report for the first traffic type in the reporting TTI concurrently with the periodic CSI report for the second traffic type. In some cases, the generating the CSI report includes: determining a CQI associated with the second TTI length based on the reference resource. In some cases, the generating the CSI report includes determining a second CQI associated with the third TTI length based on the reference resource. In some cases, the generating the CSI report includes determining that the reference resource has the third TTI length. In some cases, the generating the CSI report is based on an absence of control channel overhead, a predetermined amount of control channel overhead, an amount of control channel overhead in a TTI associated with the trigger, or a number of available resource elements determined from a ratio of the second TTI length to the first TTI length and a number of available resource elements for the first TTI length. In some cases, transmitting the CSI report includes transmitting a PUSCH punctured by the generated CSI report, where the generated CSI report includes a CSI report for the second traffic type. That is, the generated CSI report may be an sCSI generated for ULL and/or URLLC, and may puncture PUSCH.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
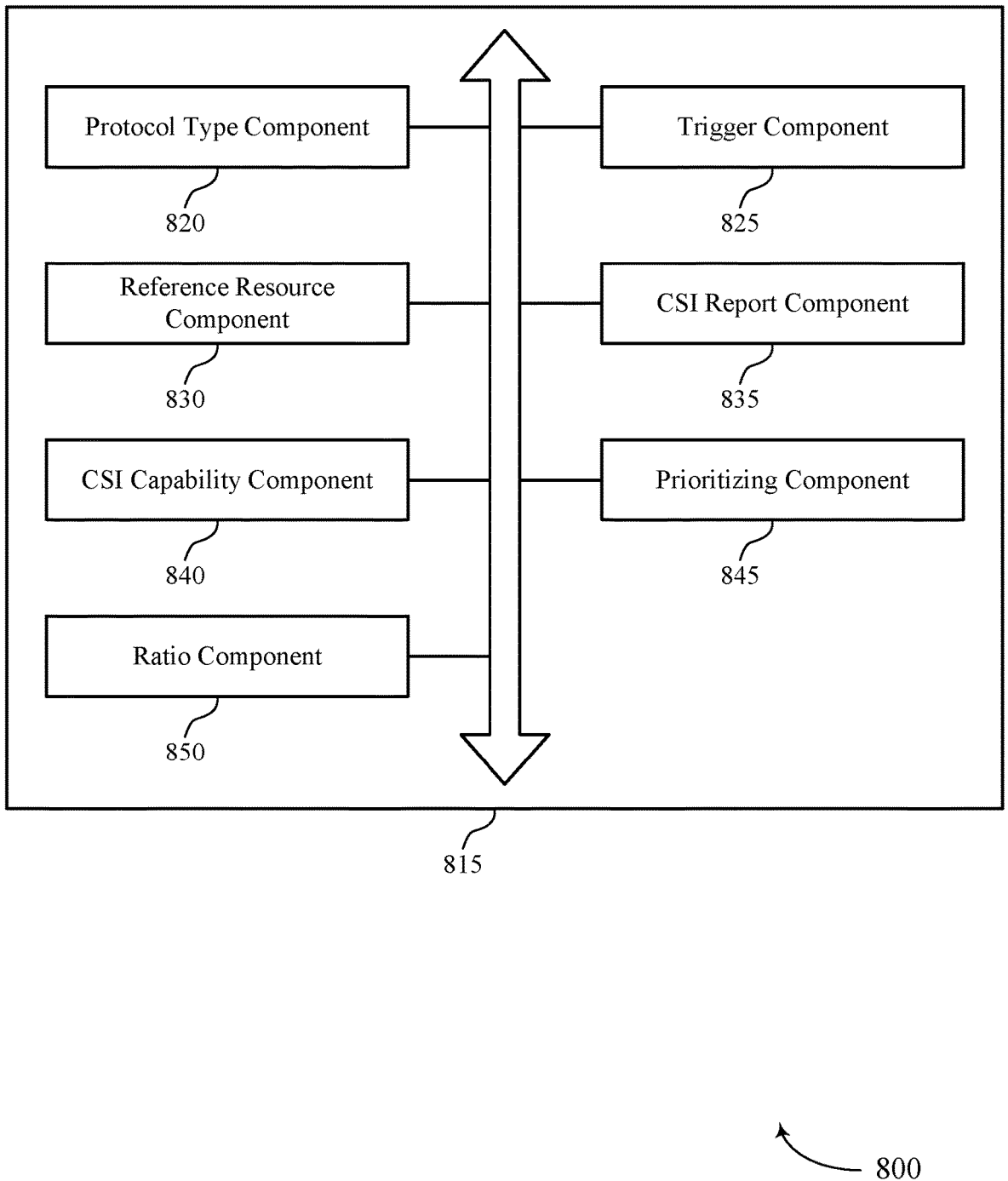

FIG. 8 shows a block diagram 800 of a communications manager 815 that supports CSI reporting for systems with multiple transmission time intervals in accordance with aspects of the present disclosure. The communications manager 815 may be an example of aspects of a communications manager 615, a communications manager 715, or a communications manager 915 described with reference to FIGS. 6, 7, and 9. The communications manager 815 may include traffic type component 820, trigger component 825, reference resource component 830, CSI report component 835, CSI capability component 840, prioritizing component 845, and ratio component 850. Each of these modules may communicate, directly or indirectly, with one another (e.g., via one or more buses).

Traffic type component 820 may establish a configuration for communication via a first traffic type utilizing a first TTI length and a second traffic type utilizing a second TTI length that is shorter than the first TTI length. In some cases, the second traffic type utilizes the second TTI length and a third TTI length that is shorter than the first TTI length and different than the second TTI length. In some cases, a first transmission mode is configured for the first traffic type and a second transmission mode that is different from the first transmission mode is configured for the second traffic type. In some cases, the second traffic type includes a ULL protocol or a URLLC protocol.

Trigger component 825 may identify a trigger for a CSI report associated with the second traffic type and receive an aperiodic CSI reporting trigger configuration including a set of indexed entries, where at least one of the set of indexed entries indicates the trigger for CSI reporting for the second traffic type. In some cases, the identifying the trigger includes receiving a DCI message associated with the first traffic type including an aperiodic CSI reporting trigger in a first TTI. In some cases, the DCI message includes an index to one of the set of indexed entries. In some cases, the reporting configuration includes a configured TTI of the second TTI length that is within the first TTI. In some cases, the reporting configuration includes a number of TTIs of the second TTI length for which the reference resource precedes the reporting TTI. In some examples, identifying the trigger may include receiving a DCI message associated with the second traffic type including an aperiodic CSI reporting trigger. In some cases, the aperiodic CSI reporting trigger triggers a second CSI report associated with the first traffic type to be transmitted with the CSI report in the reporting TTI, the reporting TTI having the second TTI length. In some cases, receiving an aperiodic CSI reporting trigger associated with the second traffic type.

Reference resource component 830 may identify a reference resource for the second traffic type for the CSI report, where the reference resource includes a TTI having the second TTI length and is identified based on a reporting configuration associated with the second TTI length. In some cases, reference resource component 830 may adjust the reference resource to a TTI having the second TTI length that precedes the reference resource.

CSI report component 835 may generate the CSI report based on the reference resource, transmit the CSI report during a reporting TTI and in response to the identified trigger, determine that an aperiodic CSI report for the first traffic type is scheduled for the reporting TTI, and transmit the aperiodic CSI report for the first traffic type in the reporting TTI concurrently with the periodic CSI report for the second traffic type. In some cases, the generating the CSI report includes determining a CQI associated with the second TTI length based on the reference resource. In some cases, the generating the CSI report includes determining a second CQI associated with the third TTI length based on the reference resource. In some cases, the generating the CSI report includes determining that the reference resource has the third TTI length. In some cases, the generating the CSI report is based on an absence of control channel overhead, a predetermined amount of control channel overhead, an amount of control channel overhead in a TTI associated with the trigger, or a number of available resource elements determined from a ratio of the second TTI length to the first TTI length and a number of available resource elements for the first TTI length. In some cases, transmitting the CSI report includes: transmitting a PUSCH punctured by the generated CSI report, where the generated CSI report includes a CSI report for the second traffic type. For example, PUSCH may be punctured by a generated SCSI for the ULL and/or URLLC traffic types.

CSI capability component 840 may signal a CSI processing capability, where the CSI processing capability indicates a first number of supported CSI processes for the first traffic type and a second number of supported CSI processes for the second traffic type and determine that a number of unreported CSI requests exceeds a threshold.

Prioritizing component 845 may prioritize generation of CSI reports for the unreported CSI requests based on a timing of triggers associated with the unreported CSI requests, traffic type priorities associated with the unreported CSI requests, a length of TTIs associated with the unreported CSI requests, respective cell indices for a plurality of configured cells associated with the unreported CSI requests, respective traffic types associated with the unreported CSI requests, or a combination thereof. In some cases, unreported CSI requests for CSI reports associated with the second TTI length are prioritized over unreported CSI requests for CSI reports associated with the first TTI length. In some cases, prioritizing component 845 may update CSI measurements for a first subset of the unreported CSI requests and suppressing updating for CSI measurements for a second subset of the unreported CSI requests.

Ratio component 850 may identify a first ratio between an EPRE for a PDSCH for the first traffic type and a first reference signal EPRE a second ratio between an EPRE for a PDSCH for the second traffic type and a second reference signal EPRE, where the generating the CSI report is based on the second ratio. In some cases, the second ratio is equal to the first ratio. In some cases, the second ratio is different than the first ratio.

Figure 9:
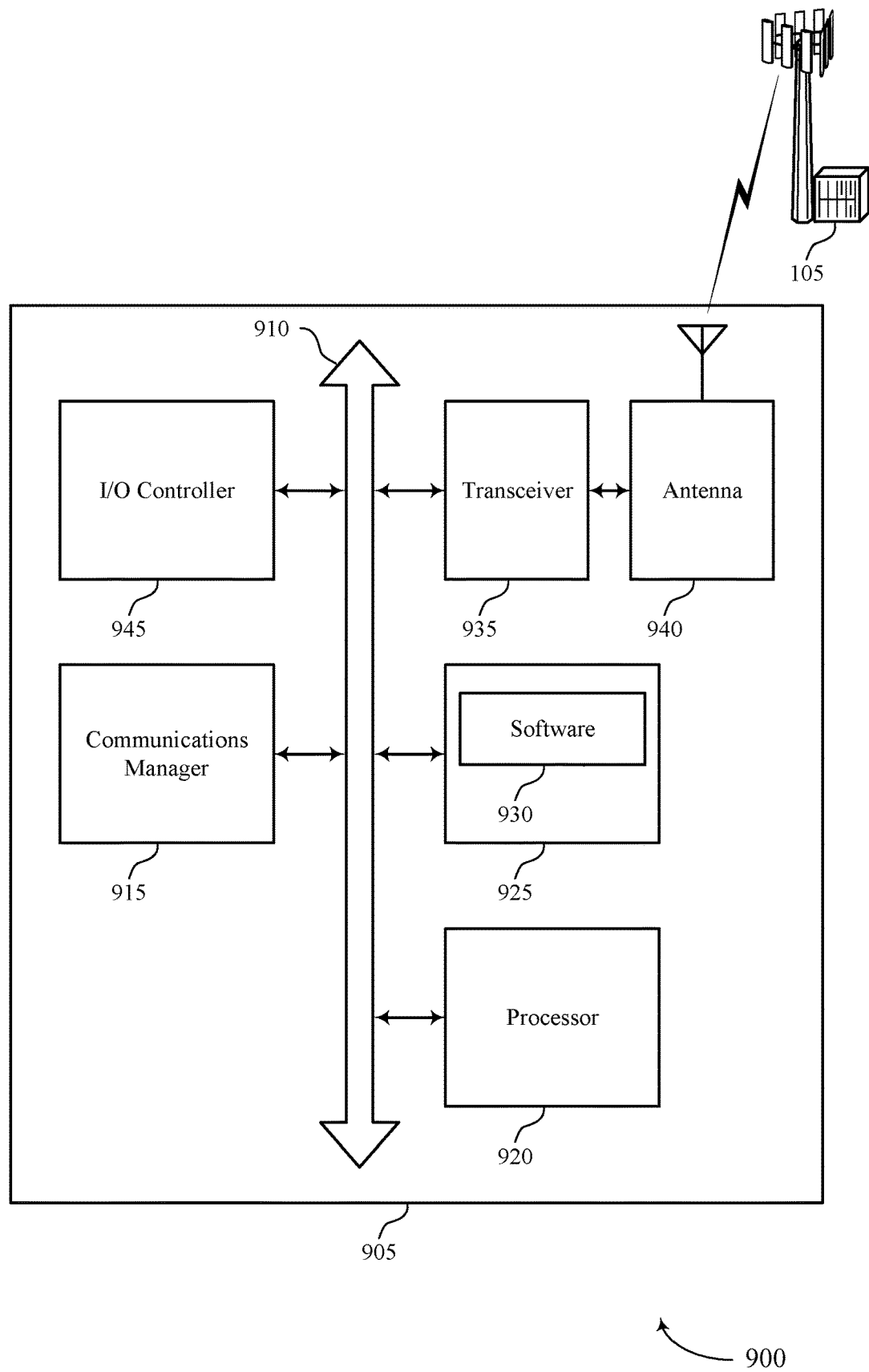
FIG. 9 illustrates a block diagram of a system including a user equipment (UE) that supports CSI reporting for systems with multiple transmission time intervals in accordance with aspects of the present disclosure.

FIG. 9 shows a diagram of a system 900 including a device 905 that supports CSI reporting for systems with multiple transmission time intervals in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting CSI reporting for systems with multiple transmission time intervals).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support CSI reporting for systems with multiple transmission time intervals. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
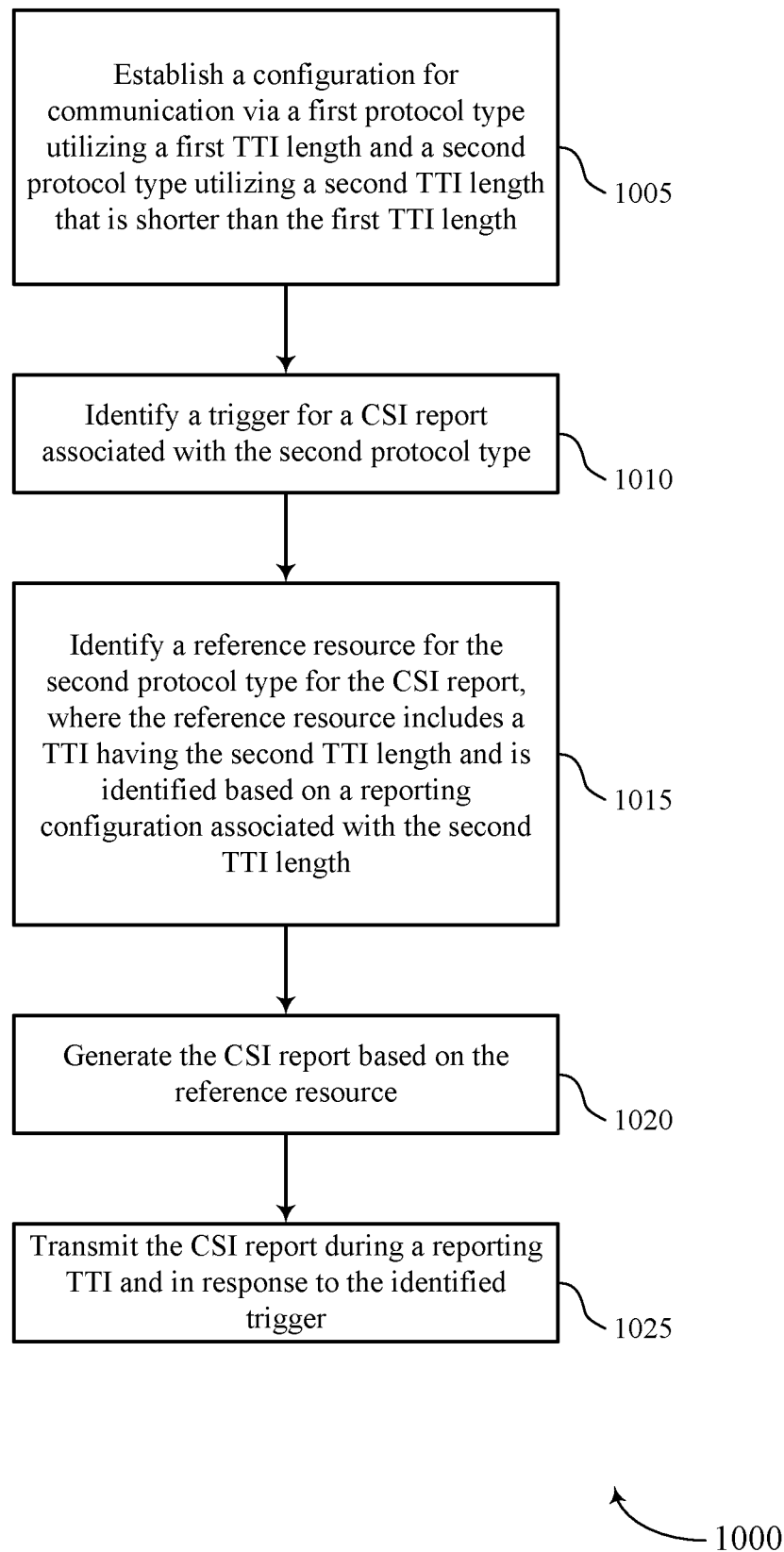
FIGS. 10 through 12 illustrate methods for CSI reporting for systems with multiple transmission time intervals in accordance with aspects of the present disclosure.

FIG. 10 shows a flowchart illustrating a method 1000 for CSI reporting for systems with multiple transmission time intervals in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1005 the UE 115 may establish a configuration for communication via a first traffic type utilizing a first TTI length and a second traffic type utilizing a second TTI length that is shorter than the first TTI length. The operations of block 1005 may be performed according to the methods described herein. In certain examples, aspects of the operations of block 1005 may be performed by a traffic type component as described with reference to FIGS. 6 through 9.

At block 1010 the UE 115 may identify a trigger for a CSI report associated with the second traffic type. The operations of block 1010 may be performed according to the methods described herein. In certain examples, aspects of the operations of block 1010 may be performed by a trigger component as described with reference to FIGS. 6 through 9.

At block 1015 the UE 115 may identify a reference resource for the second traffic type for the CSI report, wherein the reference resource comprises a TTI having the second TTI length and is identified based at least in part on a reporting configuration associated with the second TTI length. The operations of block 1015 may be performed according to the methods described herein. In certain examples, aspects of the operations of block 1015 may be performed by a reference resource component as described with reference to FIGS. 6 through 9.

At block 1020 the UE 115 may generate the CSI report based at least in part on the reference resource. The operations of block 1020 may be performed according to the methods described herein. In certain examples, aspects of the operations of block 1020 may be performed by a CSI report component as described with reference to FIGS. 6 through 9.

At block 1025 the UE 115 may transmit the CSI report during a reporting TTI and in response to the identified trigger. The operations of block 1025 may be performed according to the methods described herein. In certain examples, aspects of the operations of block 1025 may be performed by a CSI report component as described with reference to FIGS. 6 through 9.

Figure 11:
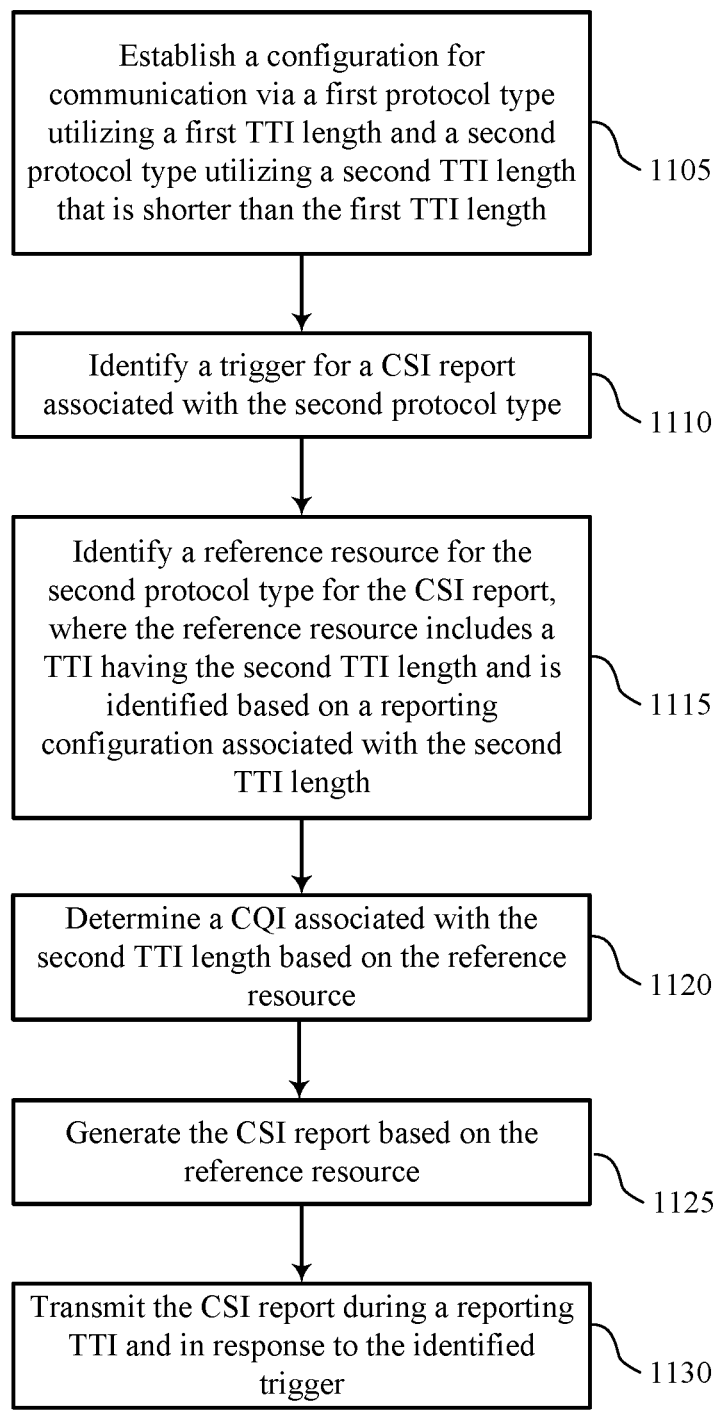

FIG. 11 shows a flowchart illustrating a method 1100 for CSI reporting for systems with multiple transmission time intervals in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1105 the UE 115 may establish a configuration for communication via a first traffic type utilizing a first TTI length and a second traffic type utilizing a second TTI length that is shorter than the first TTI length. In some cases, the second traffic type utilizes the second TTI length and a third TTI length that is shorter than the first TTI length and different than the second TTI length. The operations of block 1105 may be performed according to the methods described herein. In certain examples, aspects of the operations of block 1105 may be performed by a traffic type component as described with reference to FIGS. 6 through 9.

At block 1110 the UE 115 may identify a trigger for a CSI report associated with the second traffic type. The operations of block 1110 may be performed according to the methods described herein. In certain examples, aspects of the operations of block 1110 may be performed by a trigger component as described with reference to FIGS. 6 through 9.

At block 1115 the UE 115 may identify a reference resource for the second traffic type for the CSI report, wherein the reference resource comprises a TTI having the second TTI length and is identified based at least in part on a reporting configuration associated with the second TTI length. The operations of block 1115 may be performed according to the methods described herein. In certain examples, aspects of the operations of block 1115 may be performed by a reference resource component as described with reference to FIGS. 6 through 9.

At block 1120 the UE 115 may determine a CQI associated with the second TTI length based on the reference resource. In some examples, the UE 115 may determine a second CQI associated with the third TTI length based on the reference resource. The operations of block 1120 may be performed according to the methods described herein. In certain examples, aspects of the operations of block 1120 may be performed by a CSI report component as described with reference to FIGS. 6 through 9.

At block 1125 the UE 115 may generate the CSI report based at least in part on the reference resource, where the generated CSI report may include the CQI associated with the second TTI length. Additionally or alternatively, the UE 115 may determine that the reference resource has the third TTI length and may adjust the reference resource to a TTI having the second TTI length that precedes the reference resource, and may generate the CQI based on the adjusted reference resource. The operations of block 1125 may be performed according to the methods described herein. In certain examples, aspects of the operations of block 1125 may be performed by a CSI report component as described with reference to FIGS. 6 through 9.

At block 1130 the UE 115 may transmit the CSI report during a reporting TTI and in response to the identified trigger. The operations of block 1130 may be performed according to the methods described herein. In certain examples, aspects of the operations of block 1130 may be performed by a CSI report component as described with reference to FIGS. 6 through 9.

Figure 12:
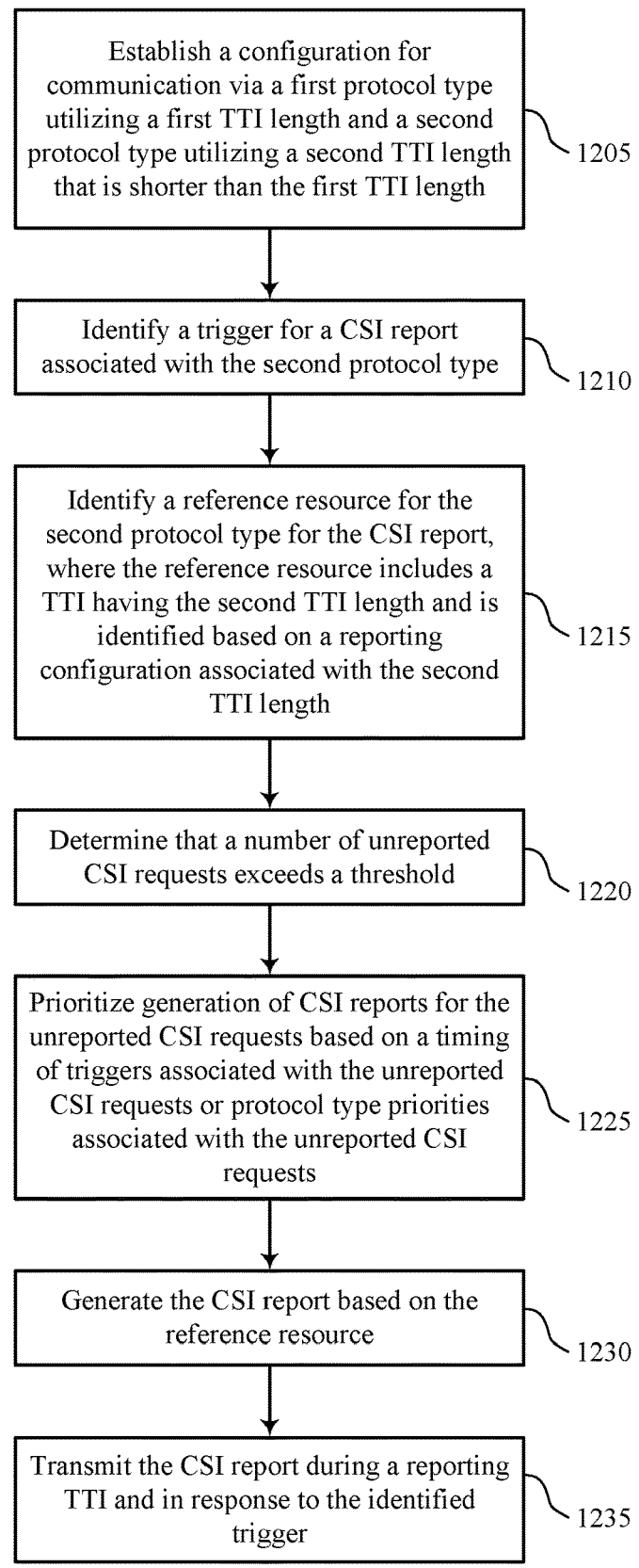

FIG. 12 shows a flowchart illustrating a method 1200 for CSI reporting for systems with multiple transmission time intervals in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may establish a configuration for communication via a first traffic type utilizing a first TTI length and a second traffic type utilizing a second TTI length that is shorter than the first TTI length. The operations of block 1205 may be performed according to the methods described herein. In certain examples, aspects of the operations of block 1205 may be performed by a traffic type component as described with reference to FIGS. 6 through 9.

At block 1210 the UE 115 may identify a trigger for a CSI report associated with the second traffic type. The operations of block 1210 may be performed according to the methods described herein. In certain examples, aspects of the operations of block 1210 may be performed by a trigger component as described with reference to FIGS. 6 through 9.

At block 1215 the UE 115 may identify a reference resource for the second traffic type for the CSI report, wherein the reference resource comprises a TTI having the second TTI length and is identified based at least in part on a reporting configuration associated with the second TTI length. The operations of block 1215 may be performed according to the methods described herein. In certain examples, aspects of the operations of block 1215 may be performed by a reference resource component as described with reference to FIGS. 6 through 9.

At block 1220 the UE 115 may determine that a number of unreported CSI requests exceeds a threshold. The operations of block 1220 may be performed according to the methods described herein. In certain examples, aspects of the operations of block 1220 may be performed by a CSI capability component as described with reference to FIGS. 6 through 9.

At block 1225 the UE 115 may prioritize generation of CSI reports for the unreported CSI requests based at least in part on a timing of triggers associated with the unreported CSI requests, traffic type priorities associated with the unreported CSI requests, a length of TTIs associated with the unreported CSI requests, respective cell indices for a plurality of configured cells associated with the unreported CSI requests, respective traffic types associated with the unreported CSI requests, or a combination thereof. In some cases, unreported CSI requests for CSI reports associated with the second TTI length are prioritized over unreported CSI requests for CSI reports associated with the first TTI length. The operations of block 1225 may be performed according to the methods described herein. In certain examples, aspects of the operations of block 1225 may be performed by a prioritizing component as described with reference to FIGS. 6 through 9.

At block 1230 the UE 115 may generate the CSI report based at least in part on the reference resource. The operations of block 1230 may be performed according to the methods described herein. In certain examples, aspects of the operations of block 1230 may be performed by a CSI report component as described with reference to FIGS. 6 through 9.

At block 1235 the UE 115 may transmit the CSI report during a reporting TTI and in response to the identified trigger. The operations of block 1235 may be performed according to the methods described herein. In certain examples, aspects of the operations of block 1235 may be performed by a CSI report component as described with reference to FIGS. 6 through 9.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   establishing a configuration for communication utilizing a first transmission time interval (TTI) length and a second TTI length that is shorter than the first TTI length;
   identifying a trigger for a channel state information (CSI) report associated with the second TTI length, wherein the CSI report is associated with a reporting TTI having the first TTI length;
   identifying a first TTI of the first TTI length based at least in part on the reporting TTI for the CSI report;
   identifying a reference resource for the CSI report, wherein the reference resource comprises a TTI having the second TTI length within the first TTI and is identified based at least in part on a reporting configuration associated with the second TTI length;
   generating the CSI report based at least in part on the reference resource; and
   transmitting the CSI report during the reporting TTI and in response to the identified trigger.

2. The method of claim 1, wherein the identifying the trigger comprises:
   receiving a downlink control information (DCI) message associated with the first TTI length comprising an aperiodic CSI reporting trigger in the first TTI.

3. The method of claim 2, further comprising:
   receiving an aperiodic CSI reporting trigger configuration comprising a plurality of indexed entries, wherein at least one of the plurality of indexed entries indicates the trigger for CSI reporting for the second TTI length, wherein the DCI message comprises an index to one of the plurality of indexed entries.

4. The method of claim 2, wherein the reporting configuration comprises a number of TTIs of the second TTI length for which the reference resource precedes the reporting TTI.

5. The method of claim 1, wherein the identifying the trigger comprises:
receiving a downlink control information (DCI) message associated with the second TTI length comprising an aperiodic CSI reporting trigger.

6. The method of claim 5, wherein the aperiodic CSI reporting trigger triggers a second CSI report associated with the first TTI length to be transmitted with the CSI report in the reporting TTI, the reporting TTI having the second TTI length.

7. The method of claim 1, wherein a first set of TTIs of the second TTI length have a first number of symbols and a second set of TTIs of the second TTI length have a second number of symbols, and wherein generating the CSI report based at least in part on the reference resource further comprises:
generating the CSI report based at least in part on the first number of symbols for the first set of TTIs and the second set of TTIs.

8. The method of claim 1, wherein the generating the CSI report comprises:
determining a channel quality indicator (CQI) associated with the second TTI length based on the reference resource.

9. The method of claim 8, wherein the configuration for communication utilizes a third TTI length that is shorter than the first TTI length and different than the second TTI length.

10. The method of claim 9, wherein the generating the CSI report comprises:
determining a second CQI associated with the third TTI length based on the reference resource.

11. The method of claim 9, wherein the generating the CSI report comprises:
determining that the reference resource has the third TTI length; and
adjusting the reference resource to a TTI having the second TTI length that precedes the reference resource.

12. The method of claim 8, wherein determining the CQI is based at least in part on an absence of control channel overhead, a predetermined amount of control channel overhead, an amount of control channel overhead in a TTI associated with the trigger, or a number of available resource elements determined from a ratio of the second TTI length to the first TTI length and a number of available resource elements for the first TTI length.

13. The method of claim 1, further comprising:
signaling a CSI processing capability, wherein the CSI processing capability indicates a first number of supported CSI processes for the first TTI length and a second number of supported CSI processes for the second TTI length.

14. The method of claim 1, further comprising:
determining that a number of unreported CSI requests exceeds a CSI processing capability threshold; and
prioritizing the unreported CSI requests based at least in part on a timing of triggers associated with the unreported CSI requests, a timing of reporting TTIs associated with the unreported CSI requests, a length of TTIs associated with the unreported CSI requests, respective cell indices for a plurality of configured cells associated with the unreported CSI requests, respective traffic types associated with the unreported CSI requests, or a combination thereof.

15. The method of claim 14, wherein unreported CSI requests for CSI reports associated with the second TTI length are prioritized over unreported CSI requests for CSI reports associated with the first TTI length.

16. The method of claim 14, wherein the prioritizing the unreported CSI requests comprises:
updating CSI measurements for a first subset of the unreported CSI requests and suppressing updating for CSI measurements for a second subset of the unreported CSI requests.

17. The method of claim 1, further comprising:
identifying a first ratio between an energy per resource element (EPRE) for a physical downlink shared channel (PDSCH) associated with the first TTI length and a first reference signal EPRE and a second ratio between an EPRE for a PDSCH associated with the second TTI length and a second reference signal EPRE, wherein the generating the CSI report is based at least in part on the second ratio.

18. The method of claim 17, wherein the second ratio is equal to the first ratio.

19. The method of claim 17, wherein the second ratio is different than the first ratio.

20. The method of claim 1, wherein the transmitting the CSI report comprises:
transmitting a physical uplink shared channel (PUSCH) punctured by the generated CSI report.

21. The method of claim 1, wherein the first TTI length is associated with a first traffic type and the second TTI length is associated with a second traffic type.

22. The method of claim 21, wherein a first transmission mode is configured for communications utilizing the first TTI length or the first traffic type and a second transmission mode that is different from the first transmission mode is configured for communications utilizing the second TTI length or the second traffic type.

23. The method of claim 21, wherein the identifying the trigger for the CSI report associated with the second TTI length comprises receiving an aperiodic CSI reporting trigger associated with the second traffic type.

24. The method of claim 1, further comprising:
determining that an aperiodic CSI report for the first TTI length is scheduled for the reporting TTI; and
transmitting the aperiodic CSI report for the first TTI length in the reporting TTI concurrently with the CSI report for the second TTI length.

25. The method of claim 1, wherein a communications protocol associated with communications utilizing the second TTI length comprises an ultra-low latency (ULL) protocol or an ultra-reliable low latency communications (URLLC) protocol.

26. An apparatus for wireless communication, comprising:
means for establishing a configuration for communication via a first transmission time interval (TTI) length and a second TTI length that is shorter than the first TTI length;
means for identifying a trigger for a channel state information (CSI) report associated with the second TTI length, wherein the CSI report is associated with a reporting TTI having the first TTI length;
means for identifying a first TTI of the first TTI length based at least in part on the reporting TTI for the CSI report;
means for identifying a reference resource for the CSI report, wherein the reference resource comprises a TTI having the second TTI length within the first TTI and is identified based at least in part on a reporting configuration associated with the second TTI length;
means for generating the CSI report based at least in part on the reference resource; and means for transmitting the CSI report during the reporting TTI and in response to the identified trigger.

27. The apparatus of claim 26, wherein the means for identifying the trigger comprises:
means for receiving a downlink control information (DCI) message associated with the first TTI length comprising an aperiodic CSI reporting trigger in the first TTI.

28. The apparatus of claim 27, further comprising:
means for receiving an aperiodic CSI reporting trigger configuration comprising a plurality of indexed entries, wherein at least one of the plurality of indexed entries indicates the trigger for CSI reporting for the second TTI length, wherein the DCI message comprises an index to one of the plurality of indexed entries.

29. The apparatus of claim 27, wherein the reporting configuration comprises a number of TTIs of the second TTI length for which the reference resource precedes the reporting TTI.

30. The apparatus of claim 26, wherein the means for identifying the trigger comprise:
receiving a downlink control information (DCI) message associated with the second TTI length comprising an aperiodic CSI reporting trigger.

31. The apparatus of claim 30, wherein the aperiodic CSI reporting trigger triggers a second CSI report associated with the first TTI length to be transmitted with the CSI report in the reporting TTI, the reporting TTI having the second TTI length.

32. The apparatus of claim 26, wherein a first set of TTIs of the second TTI length have a first number of symbols and a second set of TTIs of the second TTI length have a second number of symbols, and wherein the means for generating the CSI report based at least in part on the reference resource comprise:
means for generating the CSI report based at least in part on the first number of symbols for the first set of TTIs and the second set of TTIs.

33. The apparatus of claim 26, wherein the means for generating the CSI report comprise:
means for determining a channel quality indicator (CQI) associated with the second TTI length based on the reference resource.

34. The apparatus of claim 33, wherein the configuration for communication utilizes a third TTI length that is shorter than the first TTI length and different than the second TTI length.

35. The apparatus of claim 34, wherein the means for generating the CSI report comprise:
means for determining a second CQI associated with the third TTI length based on the reference resource.

36. The apparatus of claim 34, wherein the means for generating the CSI report comprise:
determining that the reference resource has the third TTI length; and
means for adjusting the reference resource to a TTI having the second TTI length that precedes the reference resource.

37. The apparatus of claim 33, wherein determining the CQI is based at least in part on an absence of control channel overhead, a predetermined amount of control channel overhead, an amount of control channel overhead in a TTI associated with the trigger, or a number of available resource elements determined from a ratio of the second TTI length to the first TTI length and a number of available resource elements for the first TTI length.

38. The apparatus of claim 26, further comprising:
means for signaling a CSI processing capability, wherein the CSI processing capability indicates a first number of supported CSI processes for the first TTI length and a second number of supported CSI processes for the second TTI length.

39. The apparatus of claim 26, further comprising:
means for determining that a number of unreported CSI requests exceeds a CSI processing capability threshold; and
means for prioritizing the unreported CSI requests based at least in part on a timing of triggers associated with the unreported CSI requests, a timing of reporting TTIs associated with the unreported CSI requests, a length of TTIs associated with the unreported CSI requests, respective cell indices for a plurality of configured cells associated with the unreported CSI requests, respective traffic types associated with the unreported CSI requests, or a combination thereof.

40. The apparatus of claim 39, wherein unreported CSI requests for CSI reports associated with the second TTI length are prioritized over unreported CSI requests for CSI reports associated with the first TTI length.

41. The apparatus of claim 39, wherein the means for prioritizing the unreported CSI requests comprise:
means for updating CSI measurements for a first subset of the unreported CSI requests and suppressing updating for CSI measurements for a second subset of the unreported CSI requests.

42. The apparatus of claim 26, further comprising:
means for identifying a first ratio between an energy per resource element (EPRE) for a physical downlink shared channel (PDSCH) associated with the first TTI length and a first reference signal EPRE and a second ratio between an EPRE for a PDSCH associated with the second TTI length and a second reference signal EPRE, wherein the generating the CSI report is based at least in part on the second ratio.

43. The apparatus of claim 42, wherein the second ratio is equal to the first ratio.

44. The apparatus of claim 42, wherein the second ratio is different than the first ratio.

45. The apparatus of claim 26, wherein the means for transmitting the CSI report comprise:
means for transmitting a physical uplink shared channel (PUSCH) punctured by the generated CSI report.

46. The apparatus of claim 26, wherein the first TTI length is associated with a first traffic type and the second TTI length is associated with a second traffic type.

47. The apparatus of claim 46, wherein a first transmission mode is configured for communications utilizing the first TTI length or the first traffic type and a second transmission mode that is different from the first transmission mode is configured for communications utilizing the second TTI length or the second traffic type.

48. The apparatus of claim 46, wherein the means for identifying the trigger for the CSI report associated with the second TTI length comprise means for receiving an aperiodic CSI reporting trigger associated with the second traffic type.

49. The apparatus of claim 26, further comprising:
means for determining that an aperiodic CSI report for the first TTI length is scheduled for the reporting TTI; and
means for transmitting the aperiodic CSI report for the first TTI length in the reporting TTI concurrently with the CSI report for the second TTI length.

50. The apparatus of claim 26, wherein a communications protocol associated with communications utilizing the second TTI length comprises an ultra-low latency (ULL) protocol or an ultra-reliable low latency communications (URLLC) protocol.

51. An apparatus for wireless communication, comprising:
- a processor;
- memory in electronic communication with the processor; and
- instructions stored in the memory and operable, when executed by the processor, to cause the apparatus to:
  - establish a configuration for communication utilizing a first transmission time interval (TTI) length and a second TTI length that is shorter than the first TTI length;
  - identify a trigger for a channel state information (CSI) report associated with the second TTI length, wherein the CSI report is associated with a reporting TTI having the first TTI length;
  - identify a first TTI of the first TTI length based at least in part on the reporting TTI for the CSI report;
  - identify a reference resource for the second TTI length for the CSI report, wherein the reference resource comprises a TTI having the second TTI length within the first TTI and is identified based at least in part on a reporting configuration associated with the second TTI length;
  - generate the CSI report based at least in part on the reference resource; and
  - transmit the CSI report during the reporting TTI and in response to the identified trigger.

52. The apparatus of claim 51, wherein the instructions executable by the processor to cause the apparatus to identify the trigger comprise instructions executable by the processor to cause the apparatus to:
- receive a downlink control information (DCI) message associated with the first TTI length comprising an aperiodic CSI reporting trigger in the first TTI.

53. The apparatus of claim 52, wherein the instructions are executable by the processor to:
- receive an aperiodic CSI reporting trigger configuration comprising a plurality of indexed entries, wherein at least one of the plurality of indexed entries indicates the trigger for CSI reporting for the second TTI length, wherein the DCI message comprises an index to one of the plurality of indexed entries.

54. The apparatus of claim 52, wherein the reporting configuration comprises a number of TTIs of the second TTI length for which the reference resource precedes the reporting TTI.

55. The apparatus of claim 51, wherein the instructions executable by the processor to cause the apparatus to identify the trigger comprise instructions executable by the processor to cause the apparatus to:
- receive a downlink control information (DCI) message associated with the second TTI length comprising an aperiodic CSI reporting trigger.

56. The apparatus of claim 55, wherein the aperiodic CSI reporting trigger triggers a second CSI report associated with the first TTI length to be transmitted with the CSI report in the reporting TTI, the reporting TTI having the second TTI length.

57. The apparatus of claim 51, wherein a first set of TTIs of the second TTI length have a first number of symbols and a second set of TTIs of the second TTI length have a second number of symbols, and wherein the instructions executable by the processor to cause the apparatus to generate the CSI report comprise instructions executable by the processor to cause the apparatus to:
- generate the CSI report based at least in part on the first number of symbols for the first set of TTIs and the second set of TTIs.

58. The apparatus of claim 51, wherein the instructions executable by the processor to cause the apparatus to generate the CSI report comprise instructions executable by the processor to cause the apparatus to:
- determine a channel quality indicator (CQI) associated with the second TTI length based on the reference resource.

59. The apparatus of claim 58, wherein the configuration for communication utilizes a third TTI length that is shorter than the first TTI length and different than the second TTI length.

60. The apparatus of claim 59, wherein the instructions executable by the processor to cause the apparatus to generate the CSI report comprise instructions executable by the processor to cause the apparatus to:
- determine a second CQI associated with the third TTI length based on the reference resource.

61. The apparatus of claim 59, wherein the instructions executable by the processor to cause the apparatus to generate the CSI report comprise instructions executable by the processor to cause the apparatus to:
- determine that the reference resource has the third TTI length; and
- adjust the reference resource to a TTI having the second TTI length that precedes the reference resource.

62. The apparatus of claim 58, wherein determining the CQI is based at least in part on an absence of control channel overhead, a predetermined amount of control channel overhead, an amount of control channel overhead in a TTI associated with the trigger, or a number of available resource elements determined from a ratio of the second TTI length to the first TTI length and a number of available resource elements for the first TTI length.

63. The apparatus of claim 51, wherein the instructions are executable by the processor to:
- signal a CSI processing capability, wherein the CSI processing capability indicates a first number of supported CSI processes for the first TTI length and a second number of supported CSI processes for the second TTI length.

64. The apparatus of claim 51, wherein the instructions are executable by the processor to:
- determine that a number of unreported CSI requests exceeds a CSI processing capability threshold; and
- prioritize the unreported CSI requests based at least in part on a timing of triggers associated with the unreported CSI requests, a timing of reporting TTIs associated with the unreported CSI requests, a length of TTIs associated with the unreported CSI requests, respective cell indices for a plurality of configured cells associated with the unreported CSI requests, respective traffic types associated with the unreported CSI requests, or a combination thereof.

65. The apparatus of claim 64, wherein unreported CSI requests for CSI reports associated with the second TTI length are prioritized over unreported CSI requests for CSI reports associated with the first TTI length.

66. The apparatus of claim 64, wherein the instructions are executable by the processor to cause the apparatus to prioritize the unreported CSI requests comprise instructions executable by the processor to cause the apparatus to:

update CSI measurements for a first subset of the unreported CSI requests and suppressing updating for CSI measurements for a second subset of the unreported CSI requests.

67. The apparatus of claim 51, wherein the instructions are executable by the processor to:
identify a first ratio between an energy per resource element (EPRE) for a physical downlink shared channel (PDSCH) associated with the first TTI length and a first reference signal EPRE and a second ratio between an EPRE for a PDSCH associated with the second TTI length and a second reference signal EPRE, wherein the generating the CSI report is based at least in part on the second ratio.

68. The apparatus of claim 67, wherein the second ratio is equal to the first ratio.

69. The apparatus of claim 67, wherein the second ratio is different than the first ratio.

70. The apparatus of claim 51, wherein the instructions executable by the processor to cause the apparatus to transmit the CSI report comprise instructions executable by the processor to cause the apparatus to:
transmit a physical uplink shared channel (PUSCH) punctured by the generated CSI report.

71. The apparatus of claim 51, wherein the first TTI length is associated with a first traffic type and the second TTI length is associated with a second traffic type.

72. The apparatus of claim 71, wherein a first transmission mode is configured for communications utilizing the first TTI length or the first traffic type and a second transmission mode that is different from the first transmission mode is configured for communications utilizing the second TTI length or the second traffic type.

73. The apparatus of claim 71, wherein the identifying the trigger for the CSI report associated with the second TTI length comprises receiving an aperiodic CSI reporting trigger associated with the second traffic type.

74. The apparatus of claim 51, wherein the instructions are executable by the processor to:
determine that an aperiodic CSI report for the first TTI length is scheduled for the reporting TTI; and
transmit the aperiodic CSI report for the first TTI length in the reporting TTI concurrently with the CSI report for the second TTI length.

75. The apparatus of claim 51, wherein a communications protocol associated with communications utilizing the second TTI length comprises an ultra-low latency (ULL) protocol or an ultra-reliable low latency communications (URLLC) protocol.

76. A non-transitory computer-readable medium storing code for wireless communication, the code comprising instructions executable by a processor to:
establish a configuration for communication utilizing a first transmission time interval (TTI) length and a second TTI length that is shorter than the first TTI length;
identify a trigger for a channel state information (CSI) report associated with the second TTI length, wherein the CSI report is associated with a reporting TTI having the first TTI length;
identify a first TTI of the first TTI length based at least in part on the reporting TTI for the CSI report;
identify a reference resource for the CSI report, wherein the reference resource comprises a TTI having the second TTI length within the first TTI and is identified based at least in part on a reporting configuration associated with the second TTI length;
generate the CSI report based at least in part on the reference resource; and
transmit the CSI report during the reporting TTI and in response to the identified trigger.

* * * * *